US012675173B2

(12) United States Patent
Stoeckli et al.

(10) Patent No.: US 12,675,173 B2
(45) Date of Patent: Jul. 7, 2026

(54) COMPUTER MOUSE WITH NON-IMPACT MAGNET-BASED SWITCH

(71) Applicant: Logitech Europe S.A., Lausanne (CH)

(72) Inventors: Jan Stoeckli, Jongny (CH); Wenjie Liu, Suzhou (CN); Nuno Miguel Pereira dos Anjos Valverde, Ecublens (CH); Fangming Peng, Suzhou (CN); Martin Sigrist, Bienne (CH); Mario Robert Weiss, Bienne (CH); Steve Knuchel, Bienne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/819,892

(22) Filed: Aug. 29, 2024

(65) Prior Publication Data

US 2024/0419263 A1     Dec. 19, 2024

Related U.S. Application Data

(63) Continuation of application No. PCT/CN2022/143027, filed on Dec. 28, 2022.

(51) Int. Cl.
*G06F 3/0354* (2013.01)
*H01H 13/14* (2006.01)

(52) U.S. Cl.
CPC ......... *G06F 3/03543* (2013.01); *H01H 13/14* (2013.01)

(58) Field of Classification Search
CPC ............................................ G06F 3/033–0362
See application file for complete search history.

(56) References Cited

U.S. PATENT DOCUMENTS

| | | | | |
|---|---|---|---|---|
| 11,042,224 B1* | 6/2021 | Stoeckli | ................ | G06F 3/0202 |
| 2002/0067336 A1 | 6/2002 | Wegmuller et al. | | |
| 2015/0369418 A1* | 12/2015 | Wong | ..................... | F16M 13/00 |
| | | | | 248/309.3 |

(Continued)

FOREIGN PATENT DOCUMENTS

| | | |
|---|---|---|
| CN | 107305819 A | 10/2017 |
| CN | 114446696 A | 5/2022 |
| CN | 114527885 A | 5/2022 |

OTHER PUBLICATIONS

PCT/CN2022/143027 , "International Search Report and Written Opinion", Jun. 23, 2023, 8 pages.

*Primary Examiner* — Hang Lin
(74) *Attorney, Agent, or Firm* — Kilpatrick Townsend & Stockton LLP

(57) ABSTRACT

A computer mouse with non-impact magnet-based switch. In one aspect, the switch includes a deflection plate, the deflection plate having a movable portion, a first magnet coupled on the movable portion of the deflection plate and being translatable along a predefined path, a second magnet disposed proximate the predefined path such that at least a portion of a magnetic field of the second magnet extends into a medial portion of the predefined path, where the first magnet has first and second poles, and the second magnet has third and fourth poles, the third pole facing the first pole and the fourth pole facing away from the first pole, a distance from the first pole to the third pole is less than a distance from the first pole to the fourth pole, and a polarity of the first pole is the same as the polarity of the third pole.

15 Claims, 31 Drawing Sheets

(56)        References Cited

U.S. PATENT DOCUMENTS

2019/0146600 A1 *   5/2019   Tsai ...................... G06F 3/0202
                                                345/163
2021/0213239 A1 *   7/2021   Jones ................. A61H 23/0245
2023/0187147 A1 *   6/2023   Chi ........................ H01H 13/14

* cited by examiner

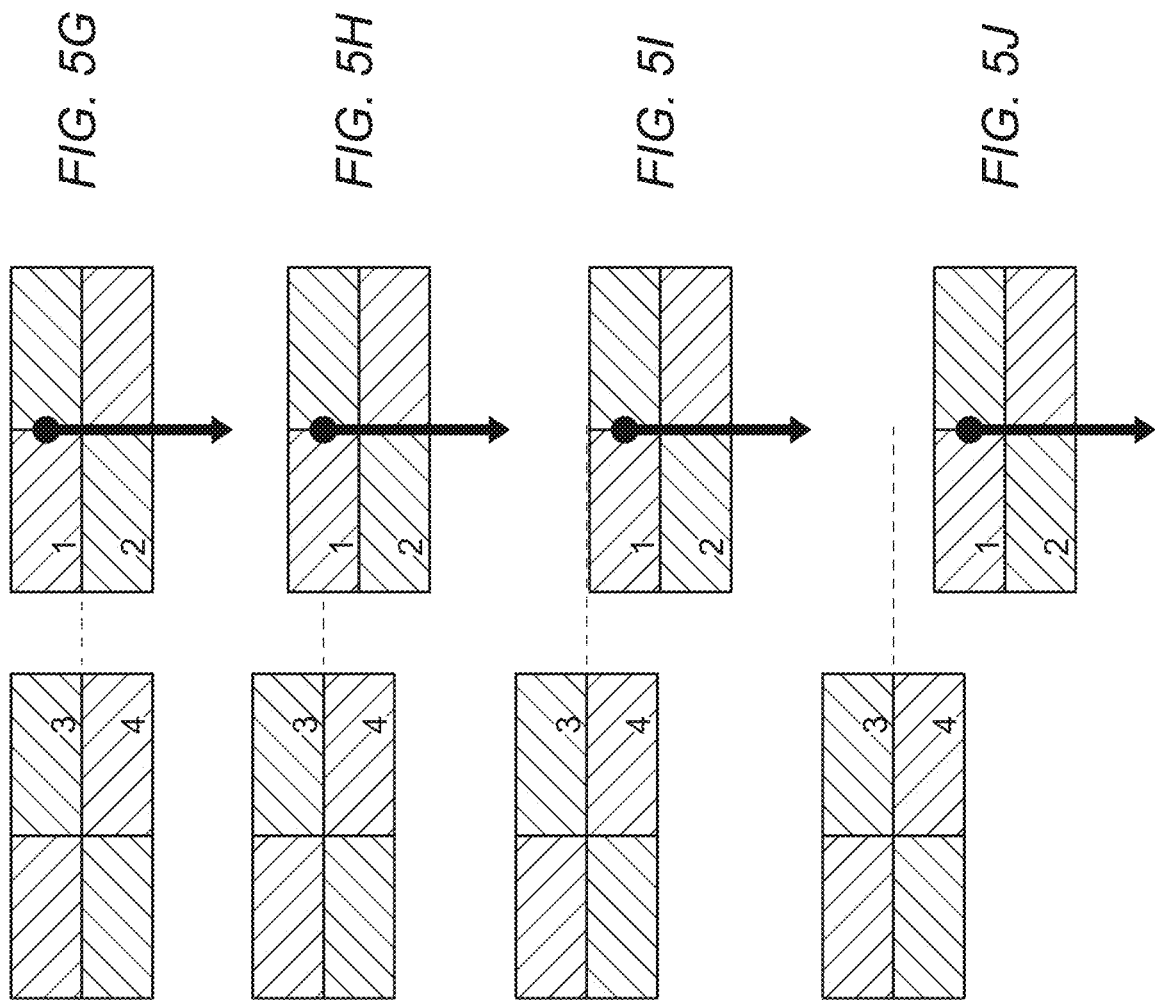

COMPUTER MOUSE WITH NON-IMPACT MAGNET-BASED SWITCH

CROSS REFERENCE PARAGRAPH FOR PRIORITY

This application is Bypass continuation of PCT Application No. PCT/CN2022/143027, filed on Dec. 28, 2022, and titled "COMPUTER MOUSE WITH NON-IMPACT MAGNET-BASED SWITCH," which is hereby incorporated by reference in its entirety for all purposes.

BACKGROUND

Input devices are commonplace in modern society and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, keyboards, virtual reality and/or augmented reality controllers, touch pads, remote controls, gaming controllers, joysticks, trackballs, and the like. Some non-limiting examples of computing systems include desktop computers, laptop computers, netbook computers, gaming consoles, tablets and "phablet" computers, smart phones, personal digital assistants, wearable devices (e.g., smart watches, glasses), virtual reality (VR) and/or augmented reality (AR) headsets and systems, and the like.

Input devices have undergone many marked improvements over the last several decades. In some contemporary input devices, such as computer mice and keyboards, buttons and/or keys often employ contact-based switches for click detection. Contact-based switches have been in the market for many years and have significantly improved in quality and price, but are subject to wear-and-tear over extended use due to repeated contact-based actuation. This can often result in unreliable performance characteristics and low signal-to-noise ratios that would be unacceptable to even casual users, much less those in the more discerning gaming community. As such, better solutions are needed.

Unless otherwise indicated herein, the materials described in this section are not prior art to the claims in this application and are not admitted to be prior art by inclusion in this section.

BRIEF SUMMARY OF THE INVENTION

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

In certain embodiments, a computer mouse comprises: a housing; a button that is translatable relative to at least a portion of the housing, the button coupled to a deflection plate, the deflection plate comprising a movable portion; a first magnet coupled on the movable portion of the deflection plate, the first magnet being translatable along a predefined path; and a second magnet disposed proximate the predefined path such that at least a portion of a magnetic field of the second magnet extends into a medial portion of the predefined path; where the first magnet has a first pole and a second pole, and the second magnet has a third pole and a fourth pole; where the third pole faces the first pole and the fourth pole faces away from the first pole; where a distance from the first pole to the third pole is less than a distance from the first pole to the fourth pole; where a polarity of the first pole is the same as the polarity of the third pole; where when an actuation force is applied on the button, the first magnet moves in a direction along the predefined path; and where when moving in the direction along the predefined path, repulsive forces between the first and second magnets cause the deflection plate to produce haptic feedback when the first magnet crosses a cross-over point that is located where a central axis of the first magnet is co-planar with a central axis of the second magnet.

In some implementations, the deflection plate is arranged to snap back when the actuation force is removed. In some embodiments, the repulsive forces between the first and second magnets reduce an amount of the actuation force applied on the button after the first magnet crosses the cross-over point in the direction along the predefined path. In various embodiments, the deflection plate is arranged to generate a noise level of 30 dBA or less when producing the haptic feedback. In some embodiments, the deflection plate comprises a first end and a second end opposite the first end, and where the first magnet is disposed on the first end of the deflection plate. In further embodiments, the housing comprises a support structure and where the second end of the deflection plate is coupled to the support structure. In some embodiments, the second magnet is disposed laterally offset from the predefined path and is within 0.5 mm of the predefined path. In yet further embodiments, the housing comprises a sensor arranged to sense changes in a position of the deflection plate, where the sensor comprises a light emitting diode (LED) and a photo-transistor, where the LED and the photo-transistor are disposed in the housing under the deflection plate.

In further embodiments, a computer mouse comprises: a housing; a button that is translatable relative to at least a portion of the housing, the button coupled to a deflection plate, the deflection plate comprising a movable portion; a first magnet coupled on the movable portion of the deflection plate, the first magnet being translatable along a predefined path; and a second magnet disposed proximate the predefined path such that at least a portion of a magnetic field of the second magnet extends into a medial portion of the predefined path; where the first magnet has a first pole and a second pole, and the second magnet has a third pole and a fourth pole; where the third pole faces the first pole and the fourth pole faces away from the first pole; where a distance from the first pole to the third pole is less than a distance from the first pole to the fourth pole; and where a polarity of the first pole is the same as the polarity of the third pole.

In some implementations, the deflection plate comprises a first end and a second end opposite the first end, and where the first magnet is disposed on the first end of the deflection plate. In some embodiments, the housing comprises a first support structure and where the second end of the deflection plate is coupled to the first support structure. In various embodiments, the housing comprises a second support structure, and where the deflection plate comprises a bent portion that extends downwards to the second support structure and is secured to the second support structure. In some aspects, the second magnet is disposed laterally offset from the predefined path and is within 0.5 mm of the predefined path. In some embodiments, the predefined path is in a shape of an arc. In yet another aspect, the computer mouse further comprising a ferromagnetic structure disposed alongside the second magnet, where the ferromagnetic structure is arranged to increase a concentration of the magnetic field of the second magnet.

In yet further embodiments, a switch comprises: a deflection plate mounted on a support structure, the deflection plate comprising a movable portion; a first magnet coupled on the movable portion of the deflection plate, the first magnet being translatable along a predefined path; and a second magnet disposed proximate the predefined path such that at least a portion of a magnetic field of the second magnet extends into a medial portion of the predefined path; where the first magnet has a first pole and a second pole, and the second magnet has a third pole and a fourth pole; where the third pole faces the first pole and the fourth pole faces away from the first pole; where a distance from the first pole to the third pole is less than a distance from the first pole to the fourth pole; and where a polarity of the first pole is the same as the polarity of the third pole.

In some implementations of the switch, the second magnet is disposed laterally offset from the predefined path and is within 0.5 mm of the predefined path. In some embodiments, the switch further comprises a third magnet disposed above the deflection plate and a fourth magnet dispose under the deflection plate, where the third and fourth magnets are arranged to dampen vibrations of the deflection plate. In various embodiments, the deflection plate comprises a bent portion that extends downwards to a fixed location and secured to the fixed location. In some aspects, the switch further comprises a ferromagnetic structure disposed alongside the second magnet, where the ferromagnetic structure is arranged to increase a concentration of the magnetic field of the second magnet.

In yet further embodiments, a switch comprises: a deflection plate mounted on a support structure, the deflection plate comprising a movable portion; first and second magnets coupled on the movable portion of the deflection plate, the first and second magnets being translatable along a predefined path; and third and fourth magnets disposed proximate the predefined path such that at least a portion of a magnetic field of the third magnet and at least a portion of a magnetic field of the fourth magnet extends into a medial portion of the predefined path; where the first magnet has a first pole and a second pole; where the second magnet has a third pole and a fourth pole; where the third magnet has a fifth pole and a sixth pole; where the fourth magnet has a seventh pole and an eight pole; where the first pole faces the fifth pole, and the third pole faces the seventh pole, and the second pole faces away from the sixth pole and the fourth pole faces away from the eight pole; where a distance from the first pole to the fifth pole is less than a distance from the first pole to the sixth pole; where a distance from the third pole to the seventh pole is less than a distance from the third pole to the eight pole; and where a polarity of the first pole is opposite the polarity of the fifth pole.

In some implementations, a polarity of the third pole is opposite the polarity of the seventh pole.

In yet another embodiments, switch comprises: a compliant structure having a movable portion; first and second magnets coupled on the movable portion of the compliant structure, the first and second magnets being translatable along a predefined path; and third and fourth magnets disposed proximate the predefined path such that at least a portion of a magnetic field of the third magnet and at least a portion of a magnetic field of the fourth magnet extends into a medial portion of the predefined path; where the first magnet has a first pole and a second pole; where the second magnet has a third pole and a fourth pole; where the third magnet has a fifth pole and a sixth pole; where the fourth magnet has a seventh pole and an eight pole; where the first pole faces the fifth pole, and the third pole faces the seventh pole, and the second pole faces away from the sixth pole and the fourth pole faces away from the eight pole; where a distance from the first pole to the fifth pole is less than a distance from the first pole to the sixth pole; where a distance from the third pole to the seventh pole is less than a distance from the third pole to the eight pole; and where a polarity of the first pole is opposite the polarity of the fifth pole.

BRIEF DESCRIPTION OF THE DRAWINGS

The features of the various embodiments described above, as well as other features and advantages of certain embodiments of the present disclosure will be more apparent from the following detailed description taken in conjunction with the accompanying drawings, in which:

FIG. 5G-5J show different stages of motion of the magnet pair system of FIG. 5E.

DETAILED DESCRIPTION OF THE INVENTION

Figure 1:
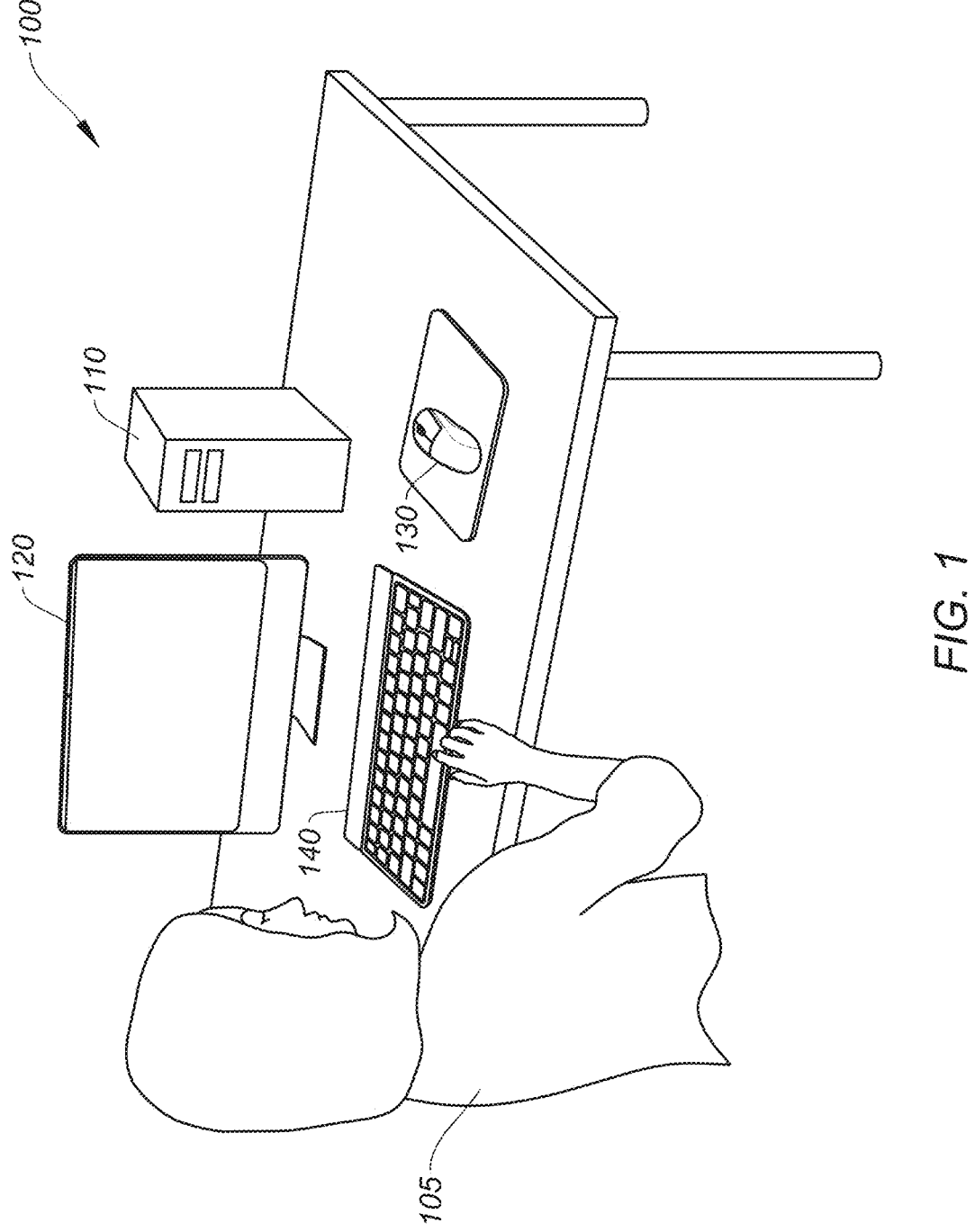
FIG. 1 shows an example of a computer system that can include any of a variety of host computing devices and computer peripheral devices, including computer peripheral devices (e.g., a computer mouse, keyboard, etc.) that can be configured to perform aspects of the various inventive concepts described herein.

Aspects of the present disclosure relate generally to electronic devices, and more particularly to modular computer peripheral devices that utilize non-impact magnet-based switches, according to certain embodiments.

In the following description, various examples of computer peripheral devices with non-impact magnet-based switches are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the disclosure relate to various improved computer peripheral devices (also referred to as input devices) that utilize non-impact magnet-based switches, as described in the embodiments that follow.

An input device, as noted above, is typically used to convert human-induced analog inputs (e.g., touches, clicks, motions, touch gestures, button presses, scroll wheel rotations, etc.) made in conjunction with the input device into digital signals for computer processing. A button (e.g., used in a computer mouse, remote control, game controller, etc.) or key (e.g., used on a keyboard) are common depressible elements that can be depressed by a user to instantiate a type of control signal (e.g., an alphanumeric character, a left/right mouse button, a trigger, etc.). For a button, in many contemporary computer mice, the button "click" detection is typically based on a type of contact-based switch, such as a galvanic or electric switch, where a physical contact between two elements causes the input device to generate a control signal (e.g., a button click).

These types of switches have been used for many decades and, through continued innovation, have seen improvements in longevity, reliability, and price.

In some embodiments, a non-impact magnet-based switch can be used in various input devices to reduce noise level and reduce mechanical wear. In various embodiments, a computer mouse with a non-impact magnet-based switch can include magnetic elements arranged to replicate switch like haptics that can replace a traditional mechanical switch. In some embodiments, the magnetic elements may be arranged to use a longitudinal magnet force, where a sudden attraction or repulsion between magnets can result in a rapid force variation perceivable by the user. In various embodiments, the magnetic elements can be arranged in a lateral configuration and may interact in close proximity without any impacts or without generating shocks, thereby substantially reducing mechanical wear and extending the switch life and reliability.

In some embodiments, an actuation of the non-impact magnet-based switch can be nearly silent. For example, an actuation of the non-impact magnet-based switch in a computer mouse may produce, for example, a noise level of 30 dBA or less at 1 m measurement distance that can be considered to be barely audible in a quiet office or room environment. In various embodiments, the computer mouse with a non-impact magnet-based switch can produce excellent user feeling while removing most of the noise that may be present in current approaches. Various embodiments of the disclosure enable more consistent and tunable click feeling for the user. In some embodiments, the non-impact magnet-based switch can include a first magnet disposed on a deflection plate and a second magnet. When an actuation force is applied on a button of the computer mouse, the first magnet can move in a direction along the predefined path. When the first magnet moves in the direction along the predefined path, repulsive forces between the first and second magnets can cause the deflection plate to produce haptic feedback when the first magnet crosses a cross-over point that is located where a central axis of the first magnet is co-planar with a central axis of the second magnet.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

FIG. 1 shows an example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 shows a user 105 operating a host computing device (shown as a desktop computer) 110 and a number of computer peripheral devices communicatively coupled to and integrated with the host computing device, including a display device 120, a computer mouse 130, a keyboard 140, and may include any other suitable input device. Each computer peripheral device 120-140 can be communicatively coupled to host computing device 110.

Although the host computing device is shown as a desktop computer, other types of host computing devices can be used including gaming systems, laptop computers, set top boxes, entertainment systems, tablet or "phablet" computers, stand-alone head mounted displays ("HMD"), or any other suitable host computing device (e.g., smart phone, smart wearable, or the like). In some cases, multiple host computing devices may be used and one or more of the computer peripheral devices may be communicatively coupled to one or both of the host computing devices (e.g., a computer mouse may be coupled to multiple host computing devices). A host computing device may also be referred to herein as a "host computer," "host device," "computing device," "computer," or the like, and may include a machine readable medium (not shown) configured to store computer code, such as driver software, firmware, and the like, where the computer code may be executable by one or more processors of the host computing device(s) to control aspects of the host computing device, for instance via the one or more computer peripheral devices.

A typical computer peripheral device can include any suitable input device, output device or input/output device including those shown (e.g., a computer mouse) and not shown (e.g., remote control, wearables (e.g., gloves, watch, head mounted display), AR/VR controller, CAD controller, joystick, simulation shifter, stylus device, or other suitable device that can be used, for example, to convert analog inputs into digital signals for computer processing. By way of example, a computer peripheral device (e.g., computer mouse 130) can be configured to provide control signals for movement tracking (e.g., x-y movement on a planar surface, three-dimensional "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of myriad other features that can be provided by a computer peripheral device, as would be appreciated by one of ordinary skill in the art.

An input device may be a computer peripheral device, and may be referred to as either herein, as well as a "peripheral input device," "peripheral," or the like. The majority of the embodiments described herein generally refer to computer peripheral devices 130-140, however it should be understood that a computer peripheral device can be any suitable input/output (I/O) device (e.g., user interface device, control device, input unit, or the like) that may be adapted to utilize the novel embodiments described and contemplated herein.

A System for Operating a Computer Peripheral Device

Figure 2:
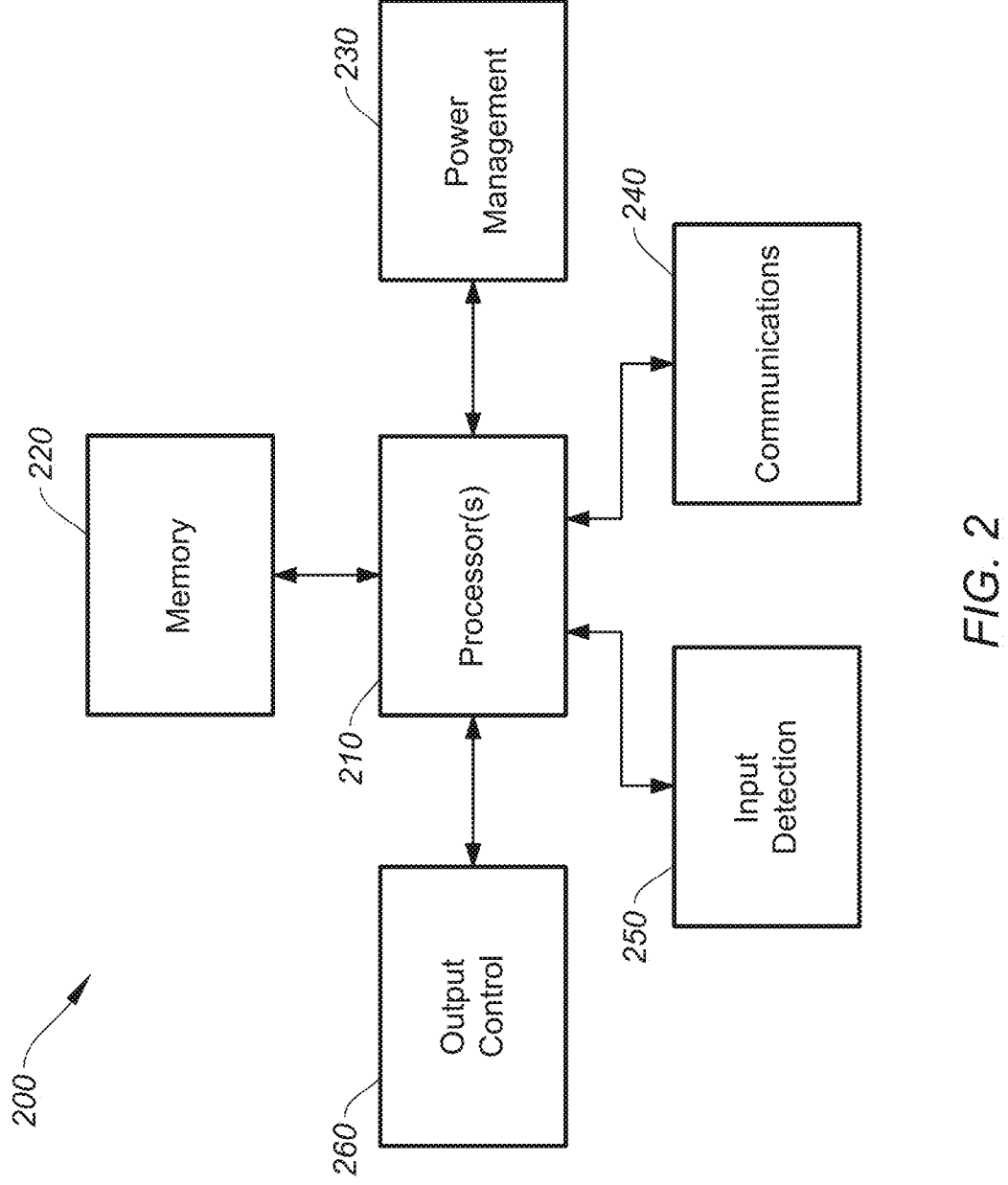
FIG. 2 shows a simplified diagram of a system configured for operating an input device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices specifically shown or not shown herein but within the wide purview of the present disclosure. System 200 may include processor(s) 210, memory 220, a power management system 230, a communication module 240, an input detection module 250, and an output control module 260. Each of the system modules 220-260 can be in electronic communication with processor(s) 210 (e.g., via a bus system). System 200 may include additional functional modules that are not shown or discussed to prevent obfuscation of the novel features described herein. System modules 220-260 may be implemented as separate modules, or alternatively, more than one system module may be implemented in a single module. In the context described herein, system 200 can be incorporated into any input device described or mentioned herein and may be further configured with any of the non-impact magnet-based switch computer peripheral device implementations presented herein, as described below at least with respect to FIGS. 4-25, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 150 (e.g., system module 220-260). Alternatively or additionally, some of system modules 220-260 may include an additional dedicated processor, which may work in conjunction with processor(s) 210. For instance, MCUs, μCs, DSPs, and the like, may be configured in other system modules of system 200. Communications module 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods described and/or covered by this disclosure in conjunction with any other system modules in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory module ("memory") 220 can store one or more software programs to be executed by processors (e.g., in processor(s) 210). It should be understood that "software"

can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device a sensor (e.g., optical sensor, accelerometer, etc.), activation of one or more input elements (e.g., buttons, sliders, touch-sensitive regions, etc.), or the like. Stored data may be aggregated and send via reports to a host computing device.

In certain embodiments, memory 220 can store the various data described throughout this disclosure. Memory 220 can be used to store any suitable data to perform any function described herein and as would be appreciated by one of ordinary skill in the art with the benefit of this disclosure. Memory array 220 can be referred to as a storage system or storage subsystem, and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled switches, etc.) as described herein.

Power management system 230 can be configured to manage power distribution, recharging, power efficiency, haptic motor power control, and the like. In some embodiments, power management system 230 can include a battery (not shown), a Universal Serial Bus (USB)—based recharging system for the battery (not shown), and power management devices (e.g., voltage regulators'not shown), and a power grid within system 200 to provide power to each subsystem (e.g., communications module 240, etc.). In certain embodiments, the functions provided by power management system 230 may be incorporated into processor(s) 210. Alternatively, some embodiments may not include a dedicated power management module. For example, functional aspects of power management module 240 may be subsumed by another module (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communication system 240 can be configured to enable wireless communication with a corresponding host computing device (e.g., 110), or other devices and/or peripherals, according to certain embodiments. Communication system 240 can be configured to provide radio-frequency (RF), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally include a hardwired connection to the corresponding host computing device. For example, input device 130 can be configured to receive a USB, Fire Wire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other modules described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHZ), etc. One of ordinary skill in the art with the benefit of this disclosure would appreciate the many modifications, variations, and alternative embodiments thereof.

Input detection module 250 can control the detection of a user-interaction with input elements (also referred to as "elements") on an input device. For instance, input detection module 250 can detect user inputs from motion sensors, keys or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.) image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on input device 130. Input detection module 250 can include one or more touch sensitive surfaces or touch sensors. Touch sensors generally include sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 150 may or may not utilize touch detection or touch sensing capabilities.

Input detection module 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piczo-buzzer coupled with microphones to detect the modification of a wave propagation pattern related to touch points, etc.), inductive sensors, magnetic sensors (e.g., Hall Effect, etc.), or the like.

Input detection module 250 may include a movement tracking sub-module that can be configured to detect a relative displacement (movement tracking) of the computer peripheral device 150. For example, input detection module 250 optical sensor(s) such as IR LEDs and an imaging array of photodiodes to detect a movement of computer peripheral device 150 relative to an underlying surface. Computer peripheral device 150 may optionally include movement tracking hardware that utilizes coherent (laser) light. Moving tracking can provide positional data (e.g., delta X and delta Y data from last sampling) or lift detection data. For example, an optical sensor can detect when a user lifts computer peripheral device 130 off of an underlying surface (also referred to as a "work surface") and can send that data to processor 210 for further processing. In some embodiments, processor 210, the movement tracking module (which may include an additional dedicated processor), or a combination thereof, as would be appreciated by one of ordinary skill in the art with the benefit of this disclosure.

In certain embodiments, accelerometers can be used for movement detection. Accelerometers can be electrome-chanical devices (e.g., micro-electromechanical systems (MEMS) devices) configured to measure acceleration forces (e.g., static and dynamic forces). One or more accelerom-eters can be used to detect three dimensional (3D) position-ing. For example, 3D tracking can utilize a three-axis accelerometer or two two-axis accelerometers (e.g., in a "3D air mouse," HMD, or other device). Accelerometers can further determine if the input device 150 has been lifted off of an underlying surface and can provide movement data that may include the velocity, physical orientation, and acceleration of computer peripheral device 150. In some embodiments, gyroscope(s) can be used in lieu of or in conjunction with accelerometer(s) to determine movement or input device orientation.

In some embodiments, output control module 260 can control various outputs for a corresponding computer peripheral device. For instance, output control module 260 may control a number of visual output elements (e.g., LEDs, LCD screens), displays, audio outputs (e.g., speakers), hap-tic output systems, or the like. One of ordinary skill in the art with the benefit of this disclosure would appreciate the many modifications, variations, and alternative embodi-ments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular modules, it is to be understood that these modules are defined for convenience of description and are not intended to imply a particular physical arrangement of component parts. Further, the modules need not correspond to physically distinct components. Modules can be config-ured to perform various operations, e.g., by programming a processor or providing appropriate control circuitry, and various modules might or might not be reconfigurable depending on how the initial configuration is obtained.

Embodiments of the present disclosure can be realized in a variety of apparatuses including electronic devices (e.g., computer peripheral devices) implemented using any com-bination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
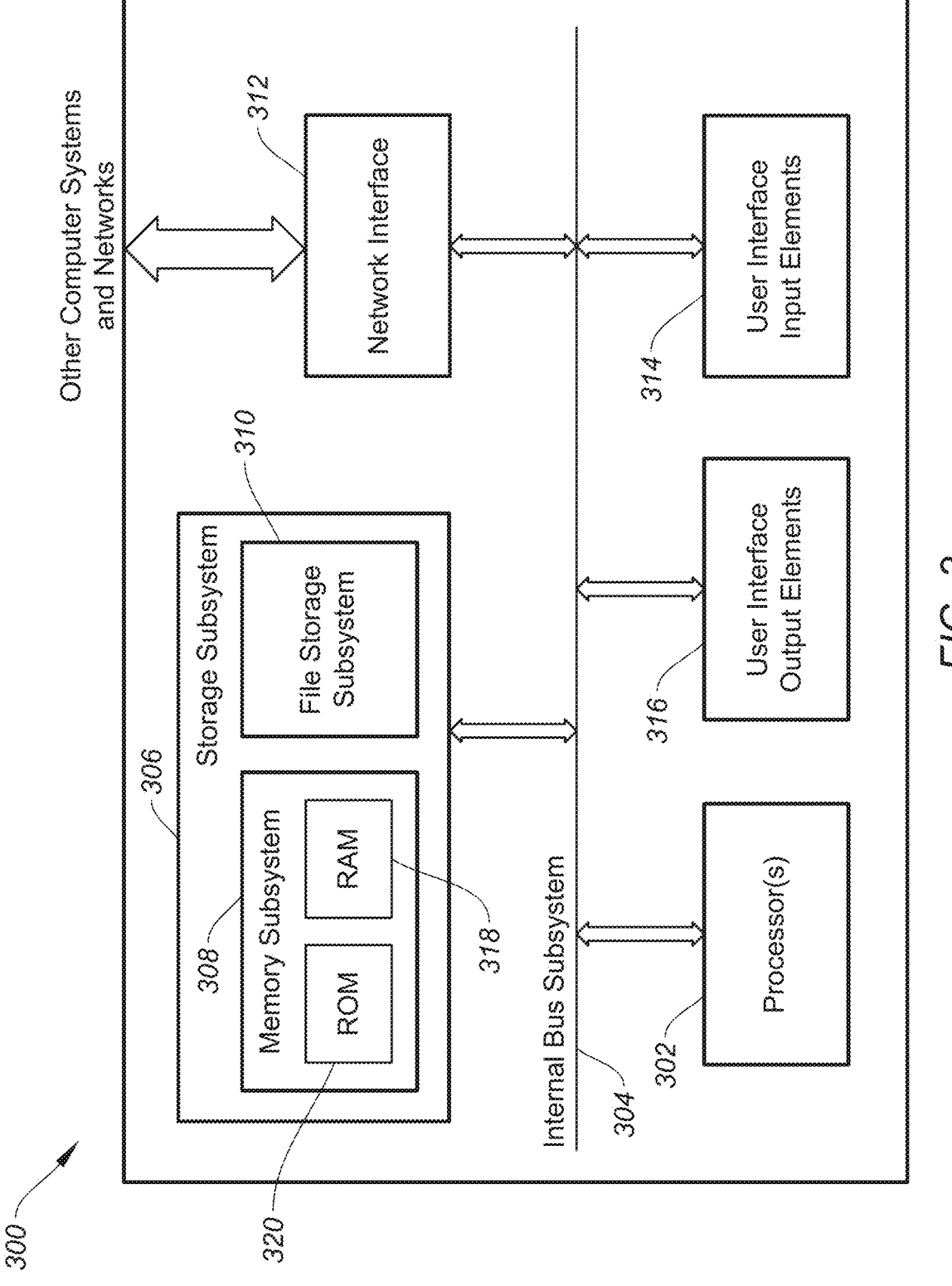
FIG. 3 shows a simplified diagram of a system for operating a host computing device, according to certain embodiments.

FIG. 3 is a simplified diagram of a host computing device 300, according to certain embodiments. Host computing device 300 can implement some or all functions, behaviors, and/or capabilities described above that would use electronic storage or processing, as well as other functions, behaviors, or capabilities not expressly described. Host computing device 300 can include a processing subsystem (processor (s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be imple-mented in any suitable computing device, such as a desktop or laptop computer (e.g., desktop computing device 110), mobile device (e.g., tablet computer, smart phone, mobile phone), wearable device, media device, or the like, or in peripheral devices (e.g., keyboards, etc.) in certain imple-mentations.

Processor(s) 302 can include MCU(s), micro-processors, application specific integrated circuits (ASICs), digital sig-nal processors (DSPs), digital signal processing devices (DSPDs), programmable logic devices (PLDs), field pro-grammable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or bat-tery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the disclosure (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, modules, steps and means described throughout the present disclosure may be done in various ways. For example, these techniques, modules, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may include sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual-or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular modules, it is to be understood that these modules are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the modules need not correspond to physically distinct components. Modules can be configured to perform various operations, e.g., by programming a processor or providing appropriate control circuitry, and various modules might or might not be reconfigurable depending on how an initial configuration is obtained. Embodiments of the present disclosure can be realized in a variety of apparatus including electronic devices implemented using a combination of circuitry and software. Host computing devices or even peripheral devices described herein can be implemented using system 300.

Computer Mouse with Non-impact Magnet-based Switch

Figure 4A:
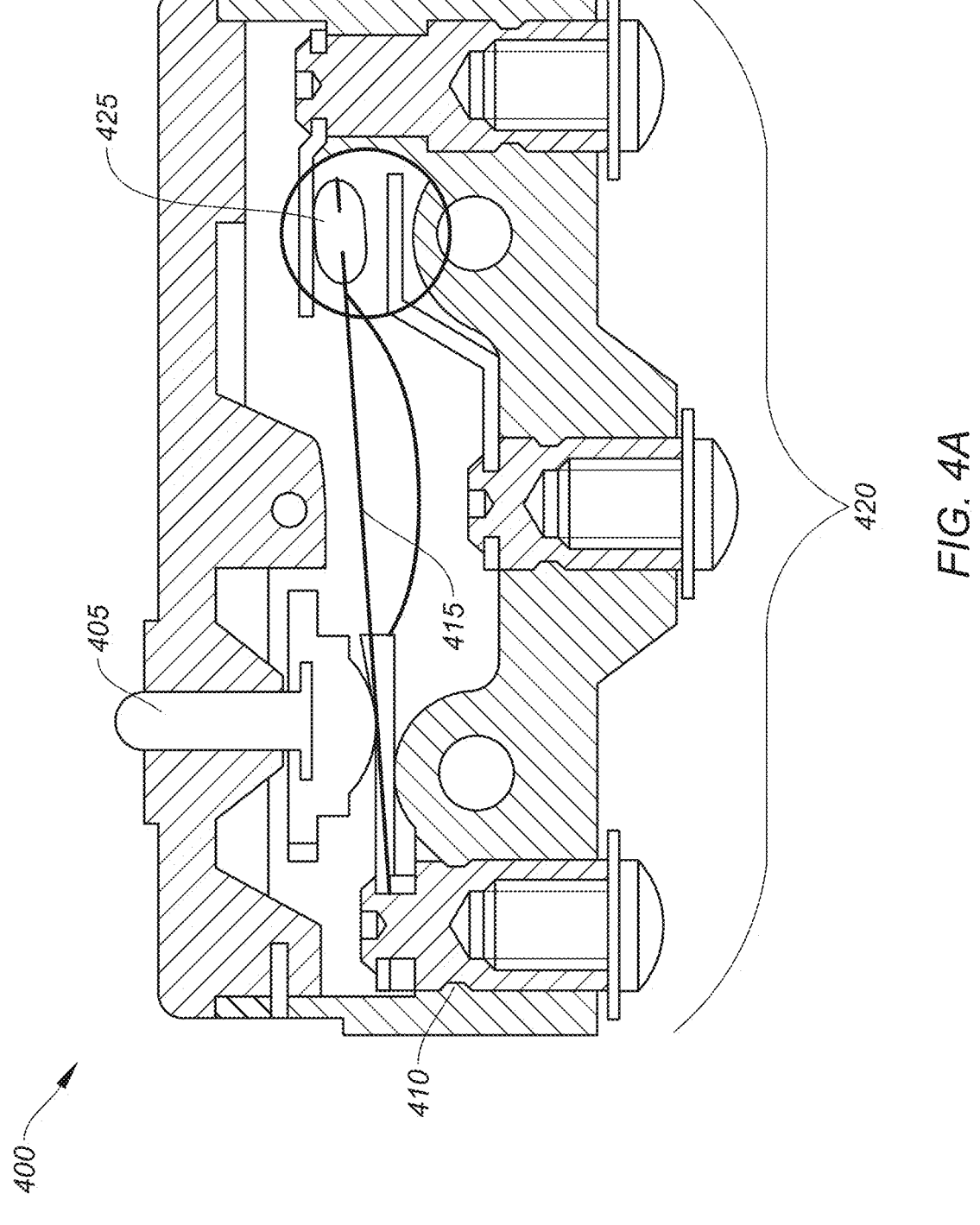
FIG. 4A shows a mechanical switch.

As noted above, a computer mouse can include a clicking button. The button can be a depressible element that can be depressed by a user to instantiate a type of control signal (e.g., an alphanumeric character, a left/right mouse button, a trigger, etc.). In current approaches, the button "click" detection can be based on electro-mechanical switches where both the electrical detection and the haptic feedback is done by the same component, a spring blade (also referred to as buckling blade), metal disk or rubber element in case of tactile switches. FIG. 4A shows a mechanical switch that is typically used in a computer mouse button. The switch 400 can include an actuator 405 that is arranged to transfer external movement and force to an internal mechanism 415. The internal mechanism 415 can be arranged to perform a snap action using a spring. The switch 400 can also include a contact section 425 that is arranged to securely open and close an electrical circuit. The switch 400 can further include a case 410 that protects the internal mechanism with electrical insulation and mechanical strength. The switch 400 can also include a terminal section 420 that is arranged to connect to external circuits.

Embodiments of the disclosure can replace a mechanical switch with a non-contact magnet-based switch. The non-contact magnet-based switch can overcome the mechanical parts wear out and aging, thereby preventing electrical contact degradation and component failure. The non-contact magnet-based switch can also overcome relatively large inconsistency in the user experience with mechanical a switch due to mechanical tolerances in a mechanical switch. Further, the non-contact magnet-based switch can avoid producing high-level acoustic emissions that can result in an impulsive loud noise generated along with the haptics in a mechanical switch.

Figure 4C:
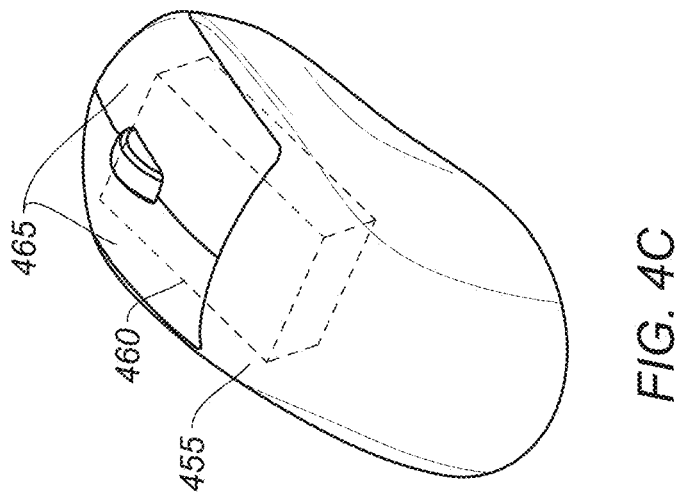
FIGS. 4B-4C show a computer mouse with a non-impact magnet-based switch according to certain embodiments.
Figure 4B:
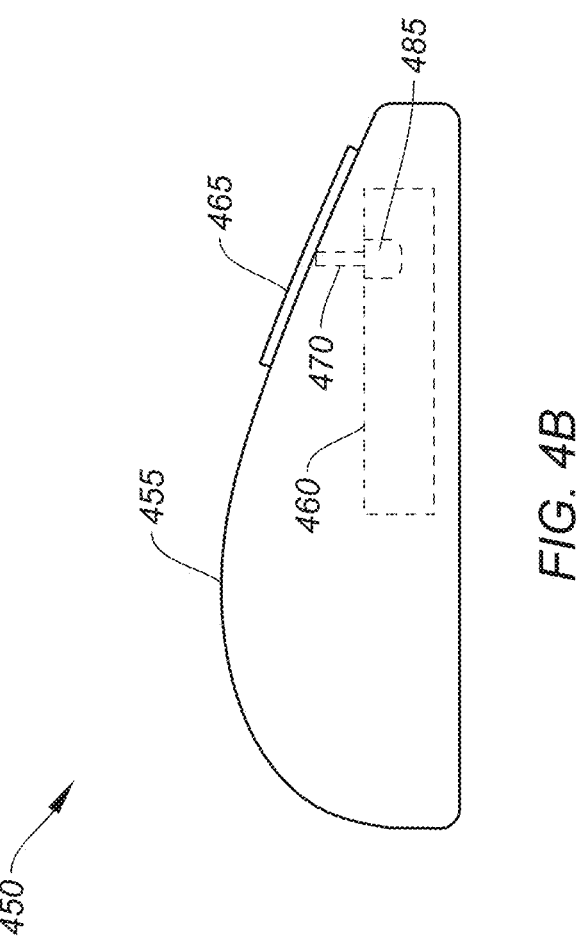

FIGS. 4B-4C show a computer mouse with a non-contact magnet-based switch according to certain embodiments. The computer mouse 450 can include a housing 455 and a button 465. The button 465 can be coupled to a non-contact magnet-based switch 460. The button 465 that can be translatable relative to at least a portion of the housing 455, and the button 465 may be coupled to a deflection plate of the non-contact magnet-based switch 460. The deflection plate may include a movable portion. An actuator 470 may be part of a keyplate of the computer mouse 450. The non-contact magnet-based switch 460 may include a plunger 485 that is coupled to the actuator 470. When a user exerts a downward force on the button, the non-contact magnet-based switch 460 can produce haptic feedback to the user. The button 465 can be integral part of the housing and can move relative to the housing. In some embodiments, the button may not be integral part of the housing. In various embodiments, the button may be located on a side of the housing or any other suitable location.

Figures 5A, 5B:
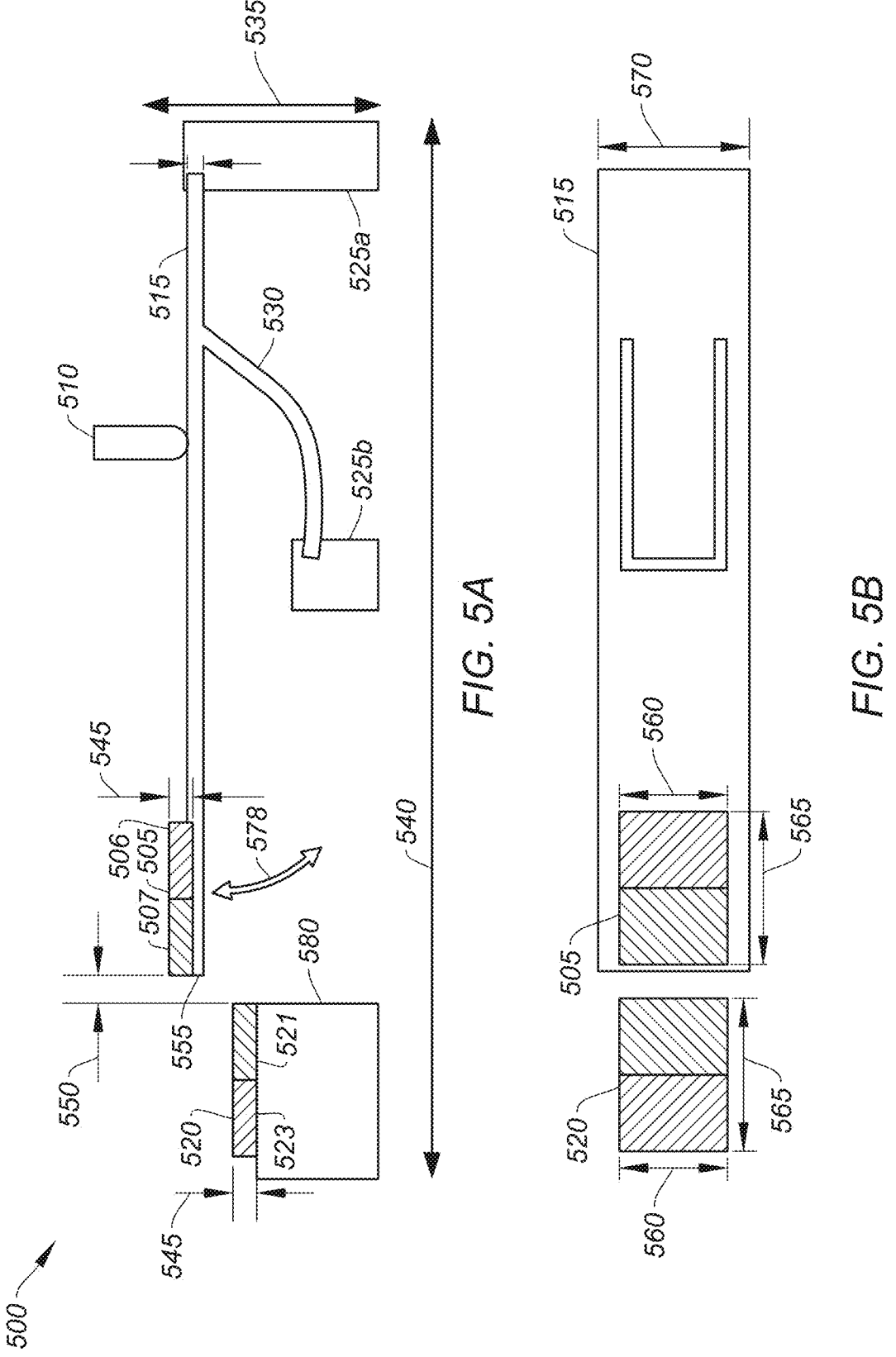
FIG. 5A shows a cross-sectional view of a non-contact magnet-based switch according to certain embodiments.
FIG. 5B shows a plan view of the non-contact magnet-based switch of FIG. 5A.
Figures 5C, 5D:
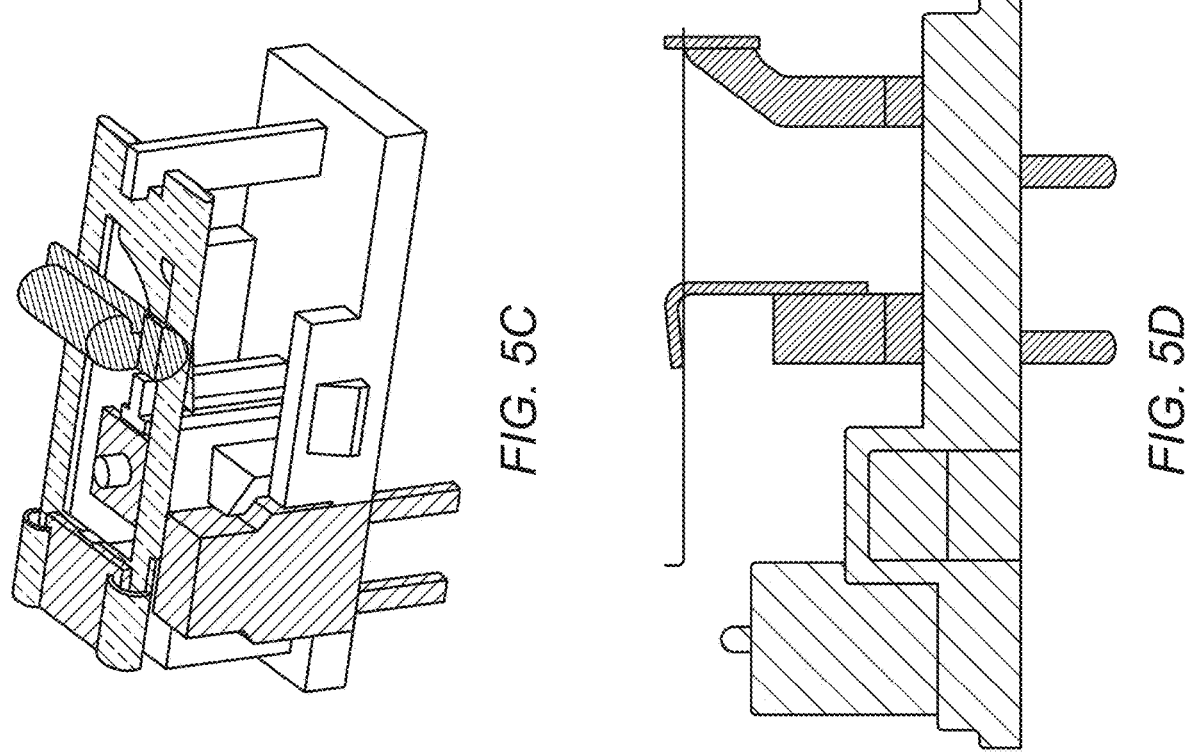
FIG. 5C shows a three-dimensional view of the non-contact magnet-based switch of FIG. 5A.
FIG. 5D shows a photo of a test coupon of the non-contact magnet-based switch.

FIGS. 5A-5D show a non-contact magnet-based switch according to certain embodiments. FIG. 5A shows a cross-sectional view of a non-contact magnet-based switch 500, while FIG. 5B shows a plan view of the non-contact magnet-based switch 500. FIG. 5C shows a three-dimensional view of the non-contact magnet-based switch, while FIG. 5D shows a photo test coupon of the non-contact magnet-based switch. The non-contact magnet-based switch 500 can include a spring blade 515 having a first end and a second end opposite the first end. The spring blade 515 may also be referred to as a deflection plate. The spring blade 515 can be coupled to a first support structure 525*a* at the first end of the spring blade 515 or can also use a cantilever, or other type of pivoting solutions only fixed at one of the 2 support structures 525*a*. The spring blade 515 can have a movable portion.

Figures 5E, 5F:
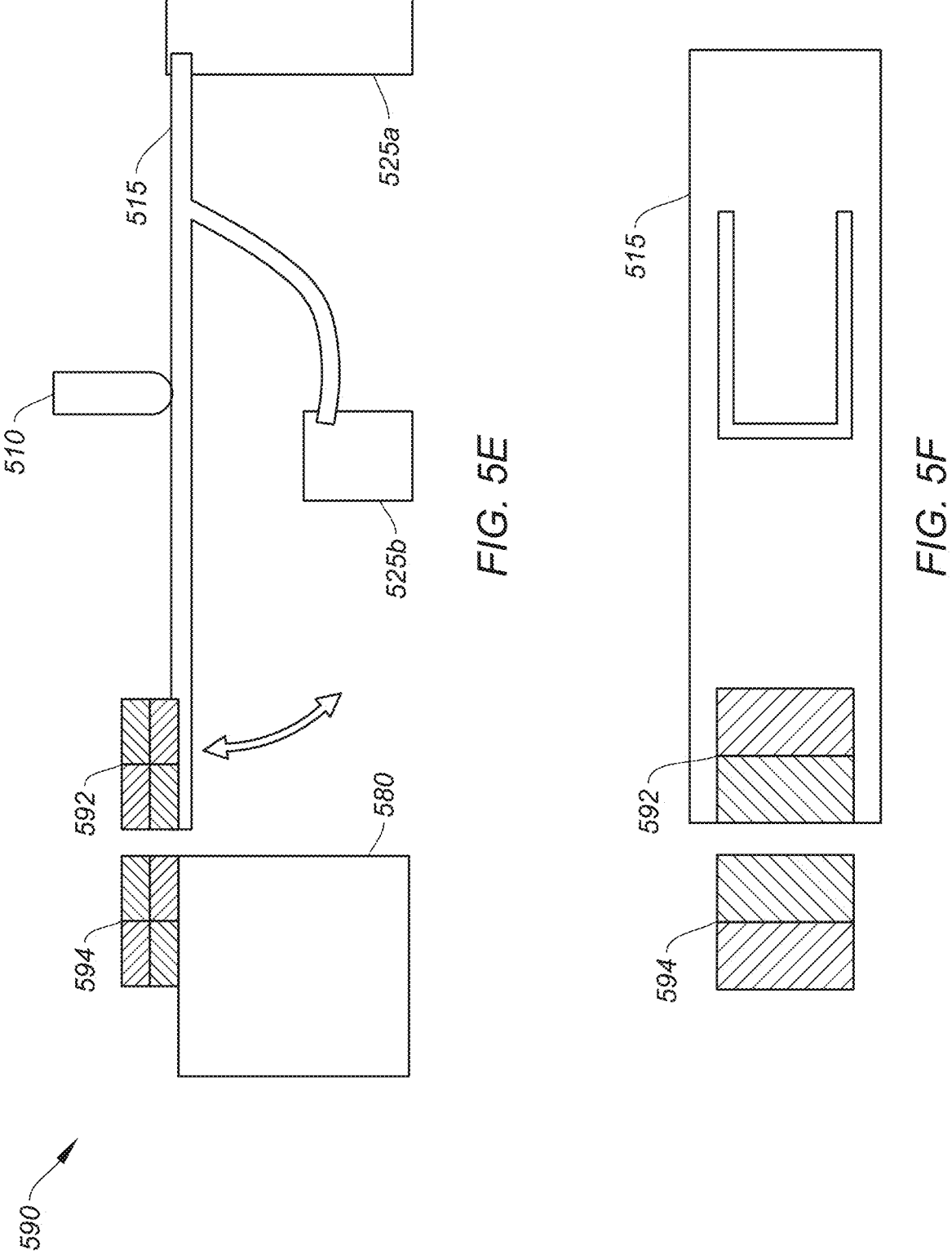
FIGS. 5E shows a cross-sectional view of a non-contact magnet-based switch that is cable of working on repulsion and attractive forces between magnets, according to certain embodiments.
FIG. 5F shows a plan view of the non-contact magnet-based switch of FIG. 5E.

FIGS. 5E-5F show a non-contact magnet-based switch according to certain embodiments. FIG. 5E shows a cross-sectional view of a non-contact magnet-based switch 590, while FIG. 5F shows a plan view of the non-contact magnet-based switch 590. The non-contact magnet-based switch 590 operates such that initially there may be an attractive force between two magnets pairs 592 and 594. Prior to start of the motion, the attraction between the pairs can hold the system in place and provides an initial resistance force to the user. Once the motion starts, the repulsion between the other magnets may add attraction, adding additional resistance for to the user. After the system passes a certain cross over point, only the repulsion force is in play, which may bring the system into an unstable state. This is the point where the haptic feedback is felt by the user. Once this point is past, the repulsion forces can quickly push the system further into the overtravel part of the curve. This is further described in the following paragraph.

FIGS. 5G-5J show different stages of motion of the magnet pair system of FIG. 5E. FIG. 5G shows an initial position of the magnetic pair system, where the two magnet pairs are attracted together, holding the position with an initial force. FIG. 5H shows a pre-travel position of the magnetic pair system, where magnets 1 and 3 are attracted, however magnets 1 and 4 are in repulsion, increasing a resistance force to the motion. FIG. 5I shows a cross-over point (click point) of the system. The attractive force between magnets 1 and 3 may be negligible at this position, however magnets 1 and 4 are in strong repulsion. At this point, the system may be unstable and can either go down or back up if the applied force is removed. FIG. 5J shows an over-travel position of the system. Magnets 1 and 4 are in strong repulsion and motion can continue downwards until a stopper is reached.

The non-contact magnet-based switch 500 can include a first magnet 505. The first magnet 505 can be coupled on the movable portion of the deflection plate 515, and the first magnet 505 can be translatable along a predefined path 578. In some embodiments, the first magnet 505 can be disposed in a horizontal position at a second end of the spring blade 515. The first magnet 505 can have a first pole 507 and a second pole 506. The non-contact magnet-based switch 500 can also include a second magnet 520. In some embodiments, the second magnet can be disposed in a horizontal position on a switch case structure 580. The second magnet 520 can be disposed proximate to the predefined path such that at least a portion of a magnetic field of the second magnet extends into a medial portion of the predefined path 578. The second magnet 520 can have a third pole 521 and a fourth pole 523. In the illustrated embodiment, the first magnet 505 is arranged to be able to move along the predefined path while the second magnet 520 is stationary. In the illustrated embodiment, the polarity of the first pole is the same as the polarity of the third pole.

The first magnet 505 is positioned apart from the second magnet 520 by a distance 550. The non-contact magnet-based switch 500 can also include a plunger 510 that is coupled to the spring blade 515 and the mouse keyplate actuator 470, at a position proximal to the first support structure 525a. The button 465 of the computer mouse 450 can be coupled to the deflection plate 515 via the plunger 510. As appreciated by one of ordinary skill in the art having the benefit of this disclosure, the plunger 510 can be positioned in any suitable position along the spring blade 515. The spring blade 515 can include a bent portion 530 that is coupled to a second support structure 525b.

When an actuation force is applied on the button 465, for example, by a user's finger, the first magnet can move in a direction along the predefined path 578. When moving in the direction along the predefined path, repulsive forces between the first and second magnets cause the deflection plate to produce resistance to the motion until the first magnet crosses a cross-over point that is located where a central axis of the first magnet is co-planar with a central axis of the second magnet, the overall motion and resistance is recognized by the user as an haptic feedback. The deflection plate 515 is arranged to snap back when the actuation force is removed. The repulsive forces between the first and second magnets can suddenly reduce an amount of the actuation force applied on the button after the first magnet crosses the cross-over point in the direction along the predefined path, hence creating a tactile cue recognizable as a click feedback. In some embodiments, the predefined path can be linear, while in other embodiments the predefined path can have a shape of an arc.

In some embodiments, the distance 550 can be 0.4 mm to 0.7 mm, while in other embodiments the distance 550 can be 0.3 mm to 0.6 mm, and in yet other embodiments the distance 550 can be 0.05 mm to 0.5 mm. As appreciated by one of ordinary skill in the art having the benefit of this disclosure, the distance 550 can be set to any suitable value. In various embodiments, a thickness 555 of the spring blade 515 can be 0.05 mm to 0.3 mm, while in other embodiments the thickness 555 can be 0.07 mm to 0.2 mm, and in yet other embodiments the thickness 555 can be 0.1 mm to 0.15 mm. As appreciated by one of ordinary skill in the art having the benefit of this disclosure, the thickness 555 can be set to any suitable value.

In some embodiments, a thickness 545 of the first or second magnets 505 and 520, respectively, can be 0.1 mm to 0.5 mm, while in other embodiments the thickness 545 can be 0.2mm to 0.4 mm, and in yet other embodiments the thickness 545 can be 0.25 mm to 0.35 mm. As appreciated by one of ordinary skill in the art having the benefit of this disclosure, the thickness 545 can be set to any suitable value. In various embodiments, a height 535 of the switch 500 can be 4 mm to 10 mm, while in other embodiments the height 535 can be 5 mm to 9 mm, and in yet other embodiments the height 535 can be 6 mm to 8.5 mm. As appreciated by one of ordinary skill in the art having the benefit of this disclosure, the height 535 can be set to any suitable value.

In some embodiments, a length 540 of the switch 500 can be 6 mm to 30 mm, while in other embodiments the length 540 can be 10 mm to 25 mm, and in yet other embodiments the length 540 can be 12.8 mm to 20 mm. As appreciated by one of ordinary skill in the art having the benefit of this disclosure, the length 540 can be set to any suitable value. In various embodiments, a width 570 of spring blade 515 can be 2 mm to 12 mm, while in other embodiments the width 570 can be 3 mm to 10 mm, and in yet other embodiments the width 570 can be 4.5 mm to 8 mm. As appreciated by one of ordinary skill in the art having the benefit of this disclosure, the width 570 can be set to any suitable value.

In some embodiments, a length 565 of the first or second magnets 505 and 520, respectively, can be 0.05 mm to 5 mm, while in other embodiments the length 565 can be 1 mm to 3 mm, and in yet other embodiments the length 565 can be 2 mm to 3 mm. As appreciated by one of ordinary skill in the art having the benefit of this disclosure, the length 565 can be set to any suitable value. In some embodiments, a width 560 of the first or second magnets 505 and 520, respectively, can be 0.05 mm to 5 mm, while in other embodiments the length 565 can be 1mm to 4 mm, and in yet other embodiments the width 560 can be 1.5 mm to 3.5 mm. As appreciated by one of ordinary skill in the art having the benefit of this disclosure, the width 560 can be set to any suitable value.

When a user presses on a computer mouse button, the button causes the plunger 510 to move in a downward motion in a first direction causing the spring blade 515 to move in the first direction as well, thereby moving the first magnet 505 in the first direction towards close proximity to the second magnet 520. When the first magnet 505 moves to a position relatively close to the second magnet 520, the first magnet 505 experiences a force, where the force can have a profile according to a graph in FIG. 6.

Figure 6:
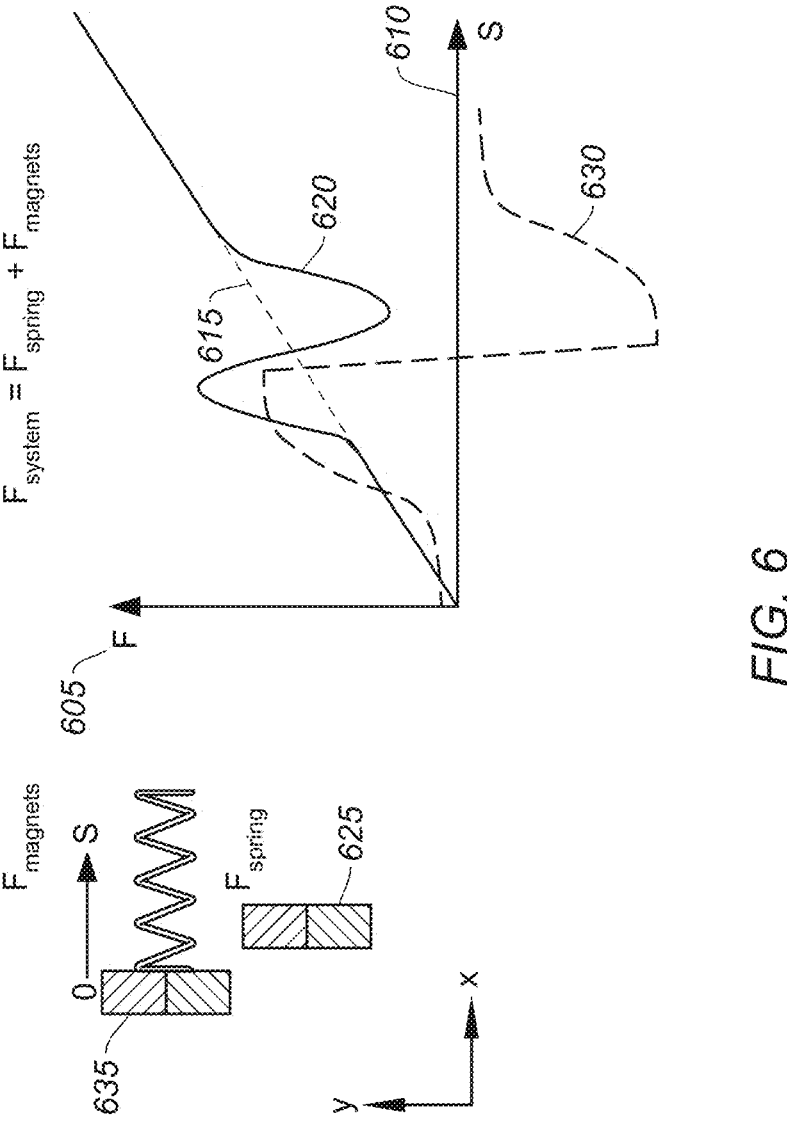
FIG. 6 shows force as a function of displacement between the magnets in the non-contact magnet-based switch of FIG. 5A.

FIG. 6 shows force 605 as a function of displacement 610 between a first magnet 625 and a second magnet 635, where the second magnet can be attached to a spring. Spring force 615 shows a spring force due to the spring. A compression spring may be used for simplification purposes, however any kind of resistive structure could be used to generate the "quasi-linear" resistance including, but not limited to, magnetic forces, rubber, and/or torsion spring, etc. Magnetic force 630 shows a magnetic force due to the magnetic field formed by the first magnet 625 and the second magnet 635.

Total system force 620 shows a total system force that is a sum of the spring force 615 and the magnetic force 630. The magnetic force 630 is at a relatively low value when the displacement between the first magnet 625 and the second magnet 635 is at a relatively low value. The magnetic force 630 increases to a maximum value in a first direction and then reverses to a maximum value in a second direction that is opposite the first direction. As displacement distance increases, the value of magnetic force 630 decreases to a relatively low value.

The total system force 620 behaves similar to the magnetic force 630 with the addition of the spring force 615. The total system force 620 increases along the spring force 615 and then increases to a maximum value due to the magnetic force 630. The total system force 620 then drops in magnitude at a relatively rapid rate. Subsequently, the total system force 620 increases until the magnetic force diminishes, and the only significant force is the spring force 615.

Therefore, a force is produced on the first magnet 505 that is transferred to the user through the spring blade 515, where the force has a first force profile similar to the total system force 620. During this process, the first and second magnets are kept separated apart, thereby preventing magnetic shocks and acoustic emissions.

Figure 7:
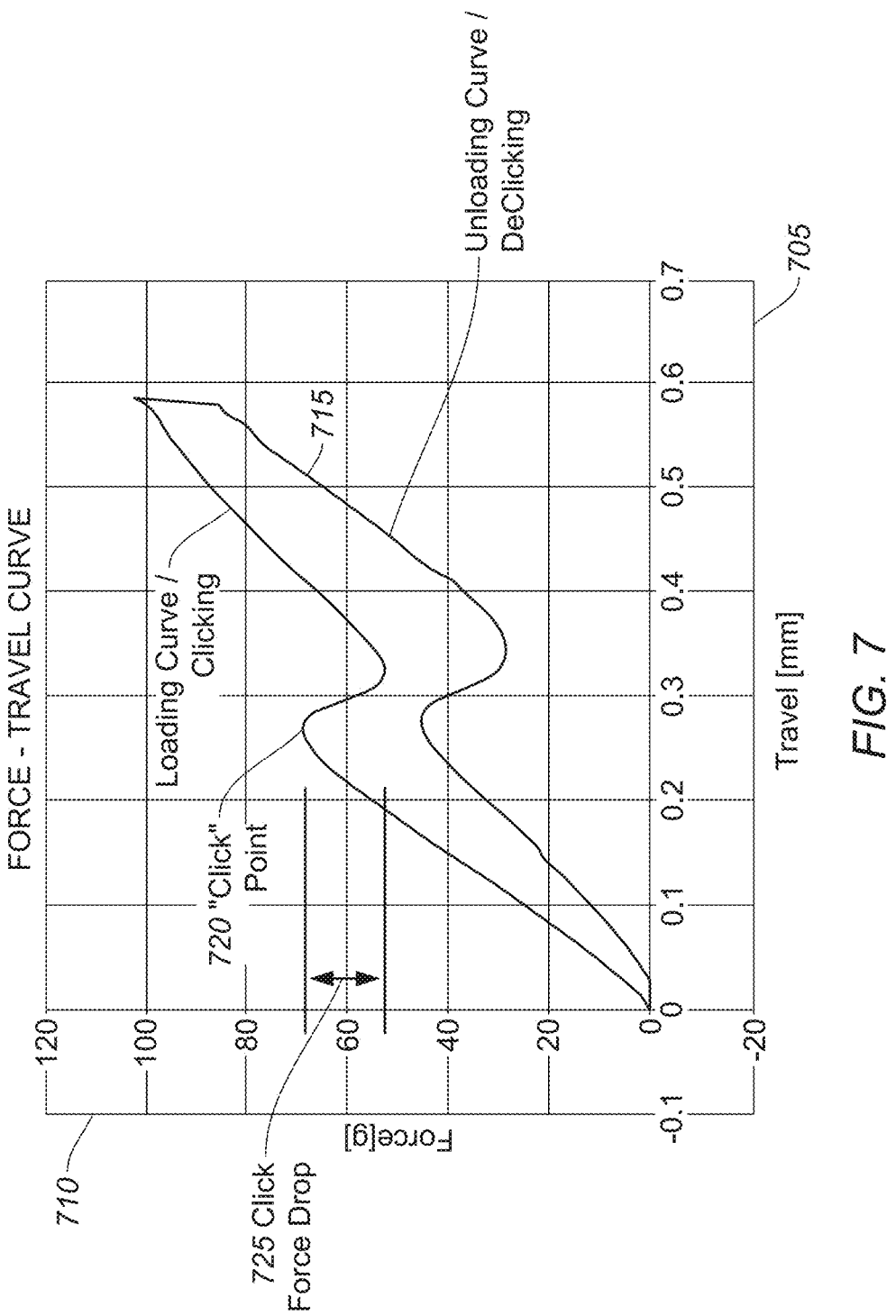
FIG. 7 shows a force as a function of displacement for a test coupon of a non-contact magnet-based switch.

FIG. 7 shows a force as a function of displacement for a test coupon of a non-contact magnet-based switch. Graph 715 shows force 710 as a function of displacement 705. As can be seen, force 710 increases to a maximum value 720 (known as the click point in a mechanical switch), decreases to a minimum value, with a given force drop 725, generating a distinct haptic feedback, and then increases again similar to total system force 620 in FIG. 6.

Figure 8:
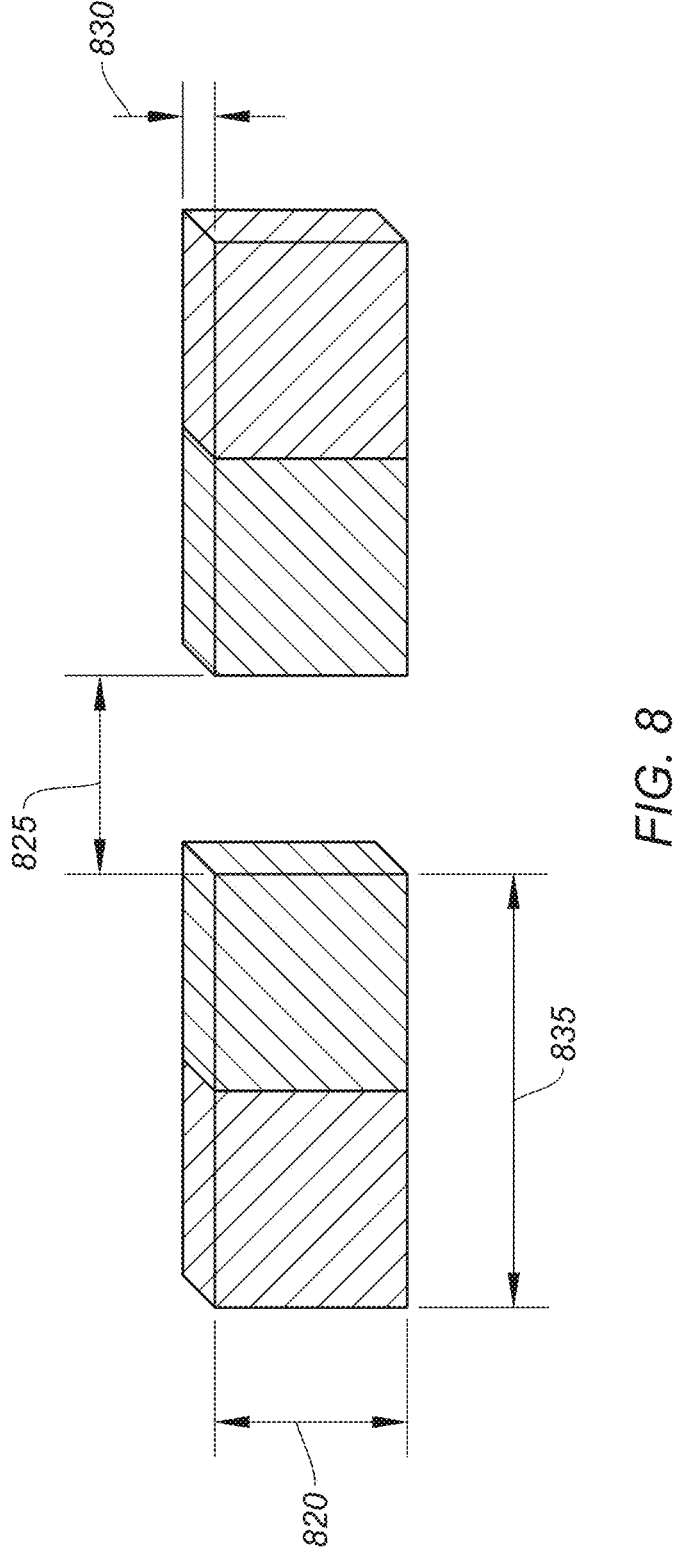
FIG. 8 shows a set of magnets used to generate haptic feedback of the non-contact magnet-based switch according to certain embodiments.

FIG. 8 shows a set of magnets used to generate haptic feedback of the non-contact magnet-based switch according to certain embodiments. Height 820 of the magnets can determine an operating travel of the first magnet. In some embodiments, the operating travel distance can have a range from a value equal to half the height of the magnets to a value equal to the height of the magnets. Magnet height can be a significant contributor to haptic feedback. Spacing, also called airgap 825 between the two magnets can be used to adjust the strength of the magnetic force. As the two magnets get closer, the magnetic force gets stronger. In the disclosed embodiments the two magnets do not touch. Width 830 of the magnets can be used to adjust the strength of the magnetic force, where increasing the width can increase the magnetic force. Stiffness of compliant structures or bending blades can be used to change the ramp up of force after the click. In some embodiments, the stiffness of compliant elements could cause the ramp up to be non-linear. Length 835 can also be used to adjust the strength of the magnetic force.

Figure 9A:
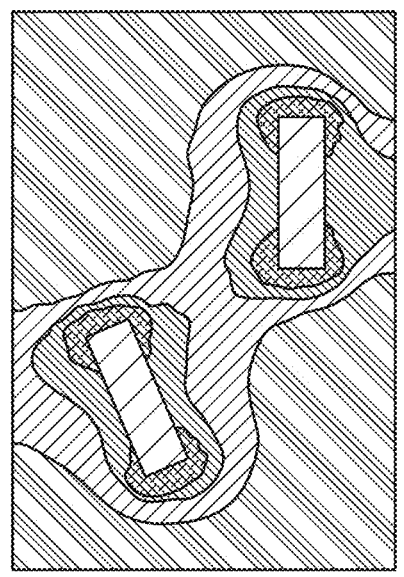
FIG. 9A shows a simulation set up for travel and force characteristics of two magnets in a non-contact magnet-based switch, according to certain embodiments.
Figure 9A:
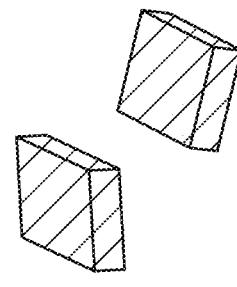
Figure 9A:
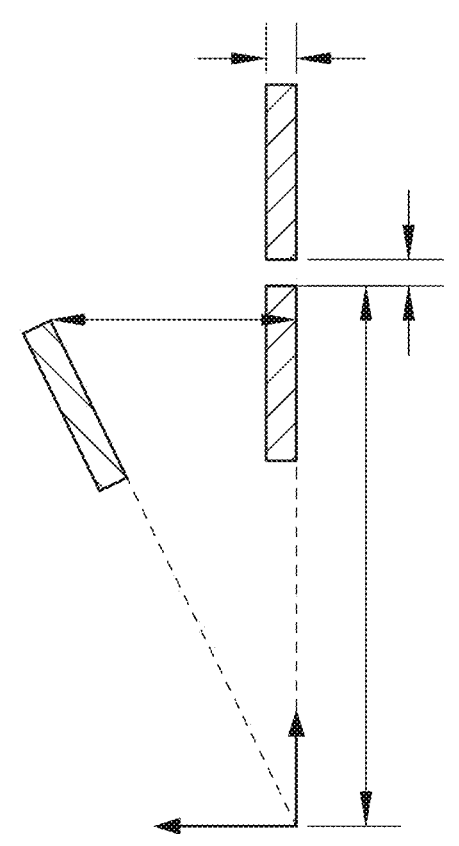
Figure 9B:
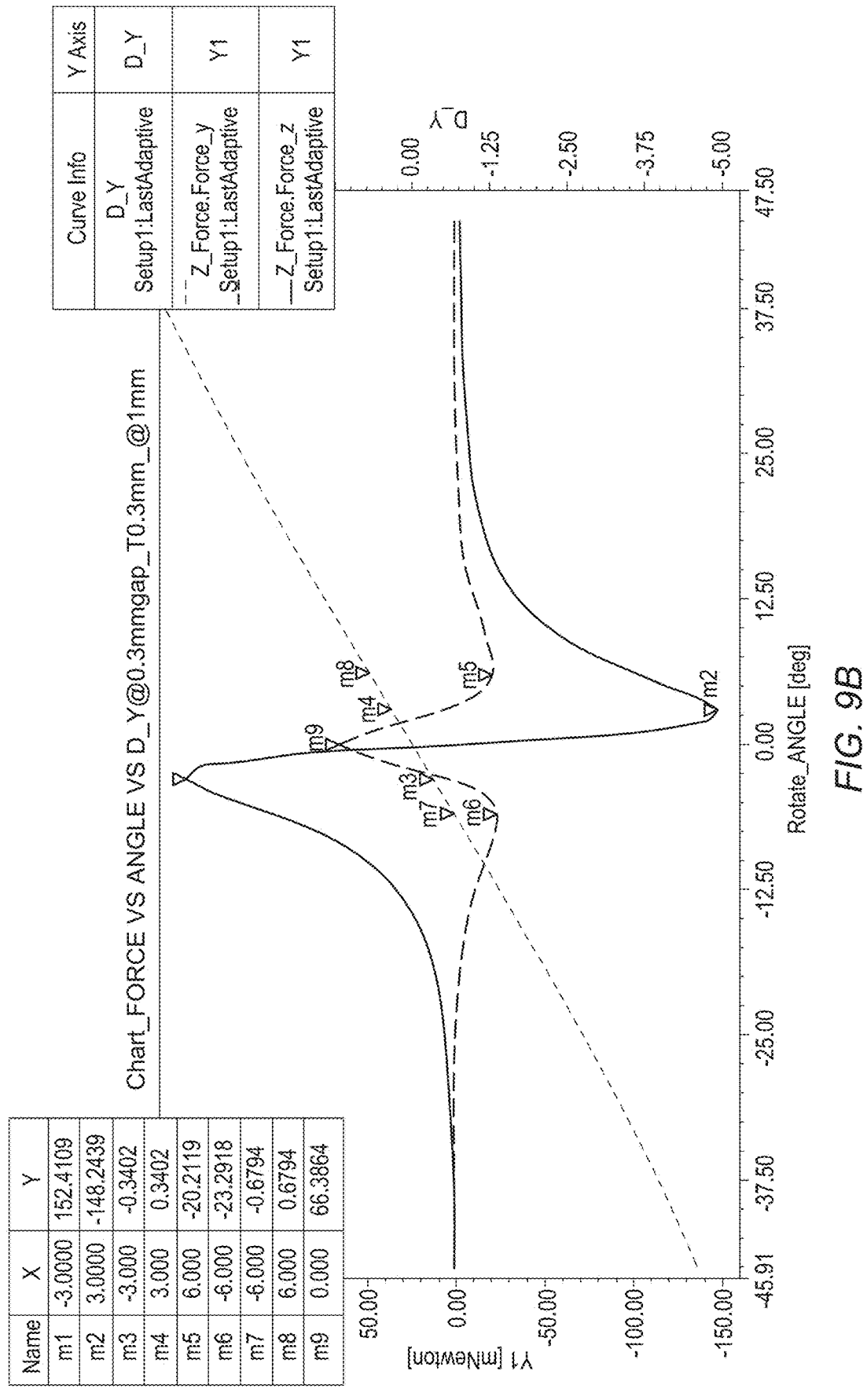
FIG. 9B shows the resulting forces for the simulation of two magnets in a non-contact magnet-based switch, according to certain embodiments.

FIG. 9A shows a simulation set up for travel and force characteristics of two magnets in a non-contact magnet-based switch, according to certain embodiments. FIG. 9B shows the resulting forces for the simulation of two magnets in a non-contact magnet-based switch, according to certain embodiments. The magnets are shown to have a rotational motion in a radial arrangement, instead of purely linear displacement. As can be seen in FIG. 9B, the two magnets can produce a sudden attraction or repulsion between the magnets when in proximity that can result in a rapid force variation perceivable by the user.

Figures 10A, 10B:
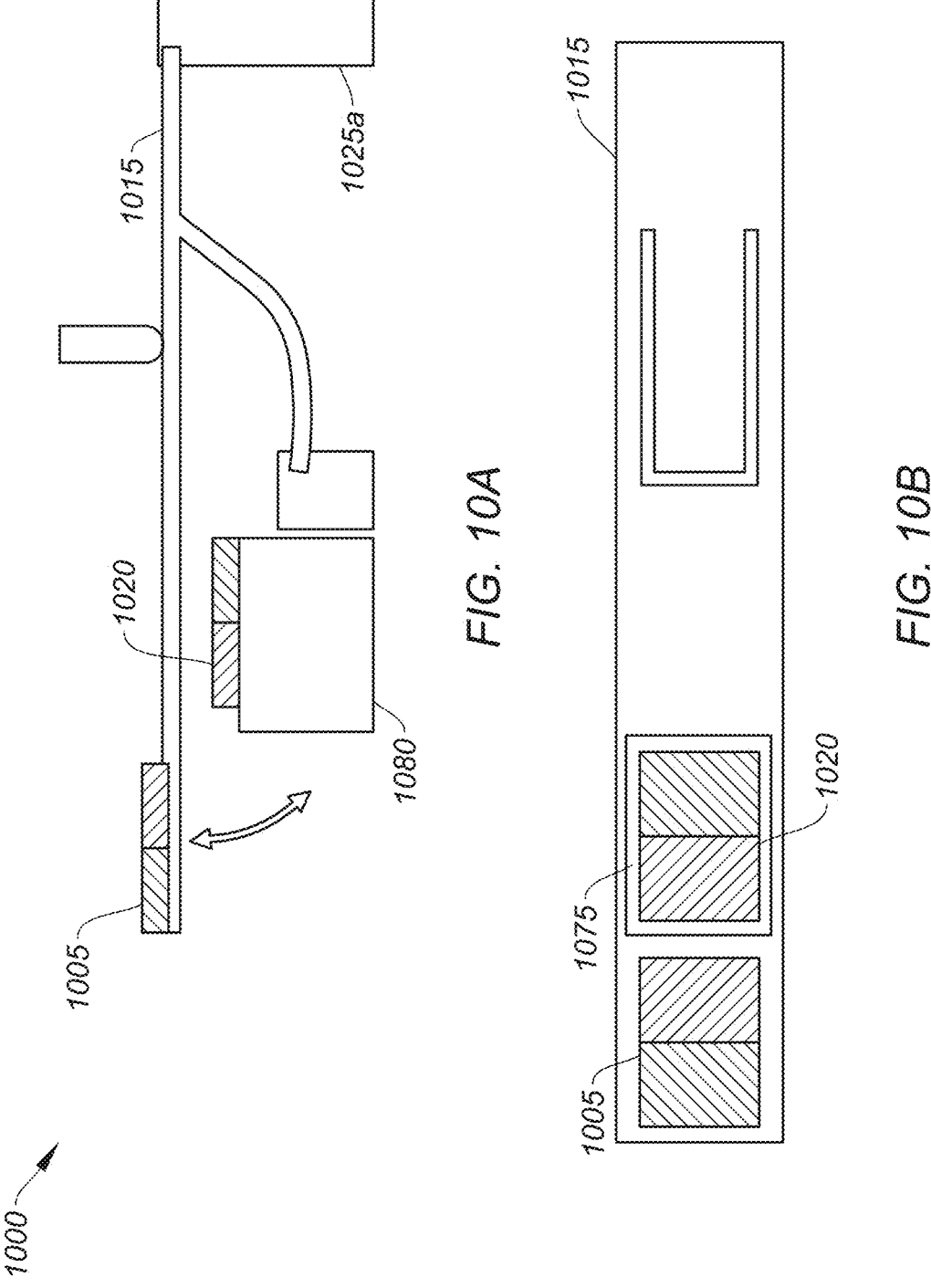
FIG. 10A shows a cross-sectional view of a non-contact magnet-based switch according to certain embodiments.
FIG. 10B shows a plan view of the non-contact magnet-based switch of FIG. 10A.

FIGS. 10A-10B show a non-contact magnet-based switch 1000 according to certain embodiments. The non-contact magnet-based switch 1000 is similar to the switch 500 of FIGS. 5A-5B except that the stationary magnet is disposed on a switch case that is positioned within a cut-away section in the spring blade. FIG. 10A shows a cross-sectional view of a non-contact magnet-based switch 1000, while FIG. 10B shows a plan view of the non-contact magnet-based switch 1000. The non-contact magnet-based switch 1000 can include a spring blade 1015 having a first end and a second end opposite the first end. The spring blade 1015 can be coupled to a first support structure 1025a at the first end of the spring blade 1015. The spring blade 1015 can include a cut-away section 1075. The non-contact magnet-based switch 1000 can include a first magnet 1005. The first magnet 1005 can be disposed in a horizontal position at a second end of the spring blade 1015. The non-contact magnet-based switch 1000 can also include a second magnet 1020 disposed in a horizontal position on a switch case 1080, such that the cut-away section 1075 of the spring blade 1015 surrounds the second magnet 1020 and the switch case 1080. In the illustrated embodiment, the first magnet 1005 can move while the second magnet 1020 is stationary.

Similar to switch 500, when a user presses on a computer mouse button, the button causes the plunger 1010 to move in a downward motion in a first direction causing the spring blade 1015 to move in the first direction as well, thereby moving the first magnet 1005 in the first direction towards close proximity to the second magnet 1020. When the first magnet 1005 moves to a position relatively close to the second magnet 1020, the first magnet 1005 experiences a force due to the magnetic field formed by the first and second magnets, where the force can have a profile according to a graph in FIG. 6. Thus, a force produced on the first magnet 1005 can be transferred to the user through the spring blade 1015, where the force has a first force profile similar to the total system force 620. During this process, the first and second magnets are kept separated apart, thereby preventing magnetic shocks and acoustic emissions. In the non-contact magnet-based switch 1000, the cut-away section 1075 is arranged such that the spring blade 1015 can move in a downward direction while staying separated from the switch case 1080.

Figure 11A:
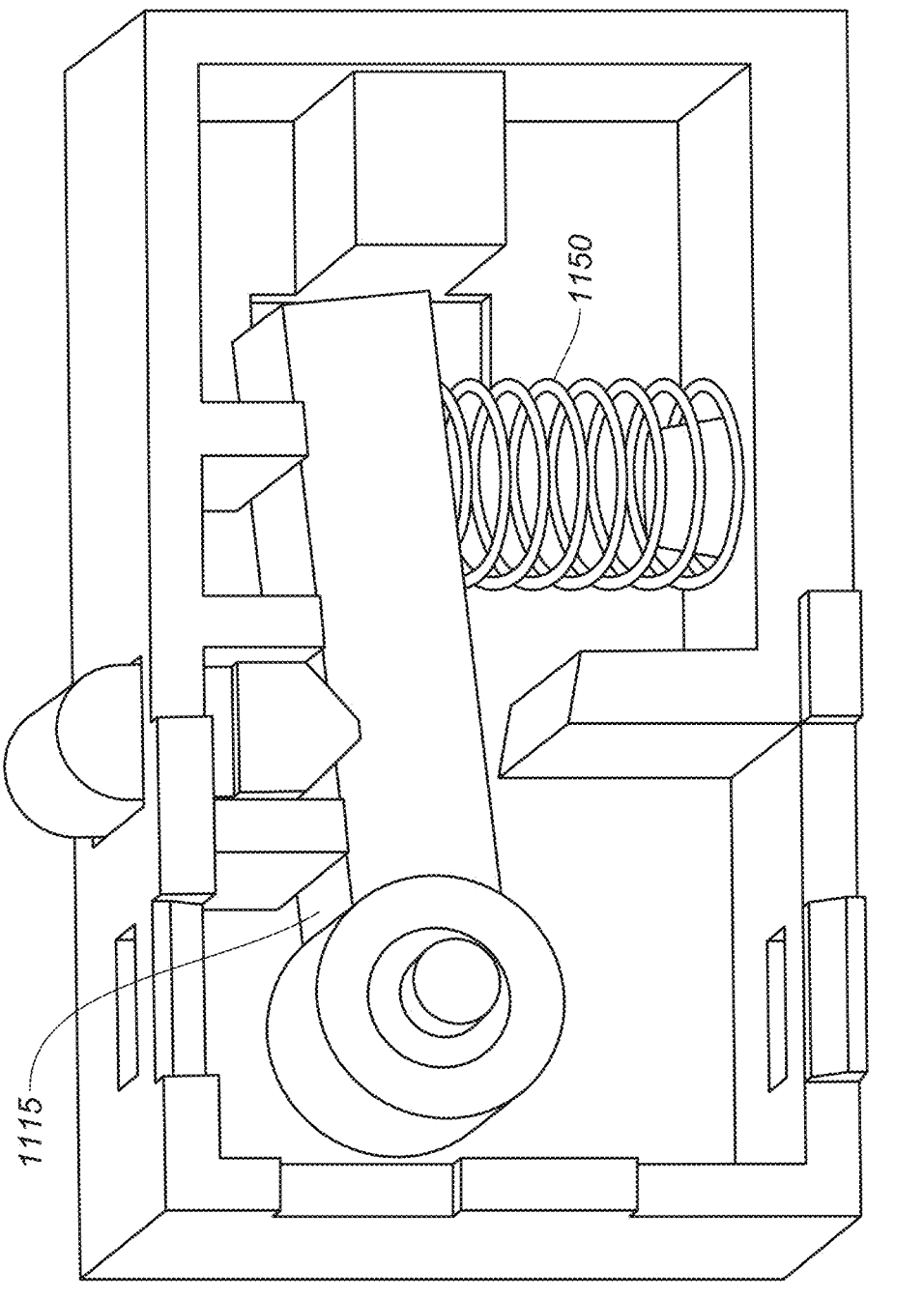
FIG. 11A shows a three-dimensional view of a non-contact magnet-based switch using a compression spring, according to certain embodiments.
Figure 11B:
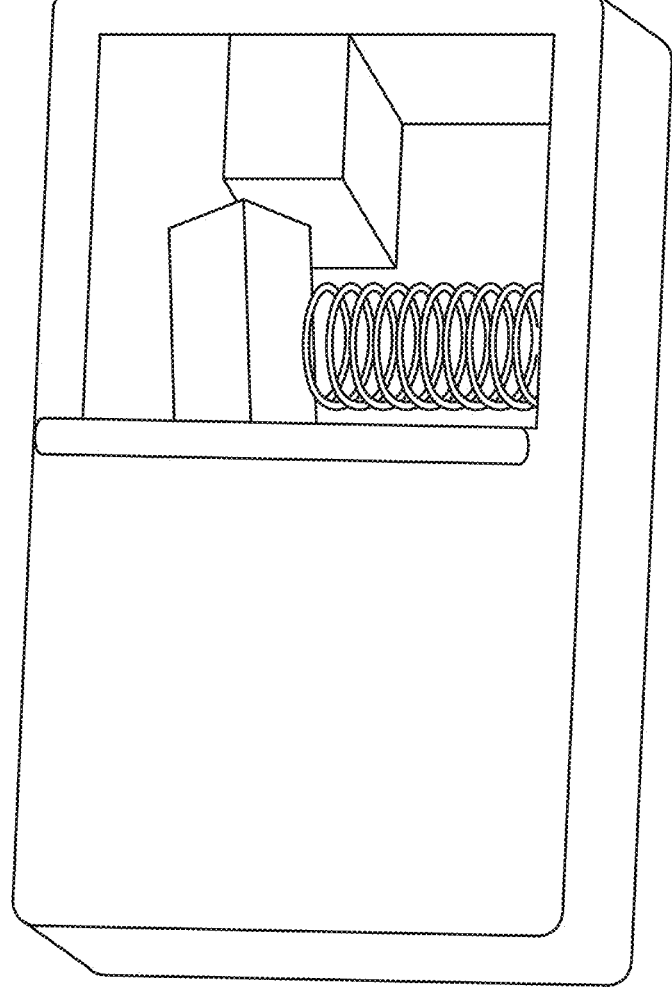
FIG. 11B shows a test coupon using a compression spring, according to certain embodiments.

FIG. 11A shows a three-dimensional view of a non-contact magnet-based switch using a compression spring, according to certain embodiments. FIG. 11B shows a test coupon using a compression spring, according to certain embodiments. In the illustrated embodiment, a movable element 1115 is used with preloading achieved by a compression spring 1150. The magnets are positioned at the end of the movable element and on the switch case.

Figure 12:
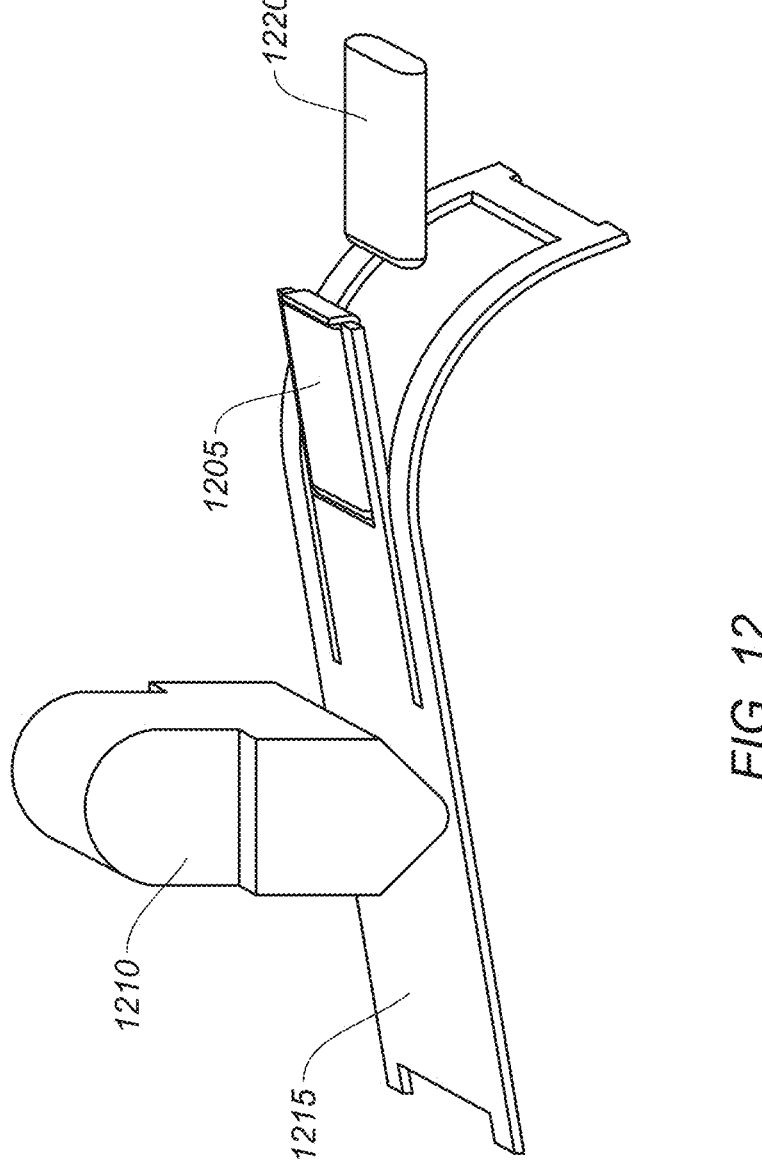
FIG. 12 shows a three-dimensional view of a non-contact magnet-based switch using a spring blade end bending, according to certain embodiments.

FIG. 12 shows a three-dimensional view of a non-contact magnet-based switch using a spring blade end bending, according to certain embodiments. In the illustrated embodiment, a spring blade 1215 is attached to a support structure at the first end of the spring blade 1215. A second end of the spring blade 1215 can be bent to produce preloading. The switch also includes a plunger 1210, a first magnet 1205 in a horizontal position and a second magnet 1220, also in a horizontal position.

Figures 13A, 13B:
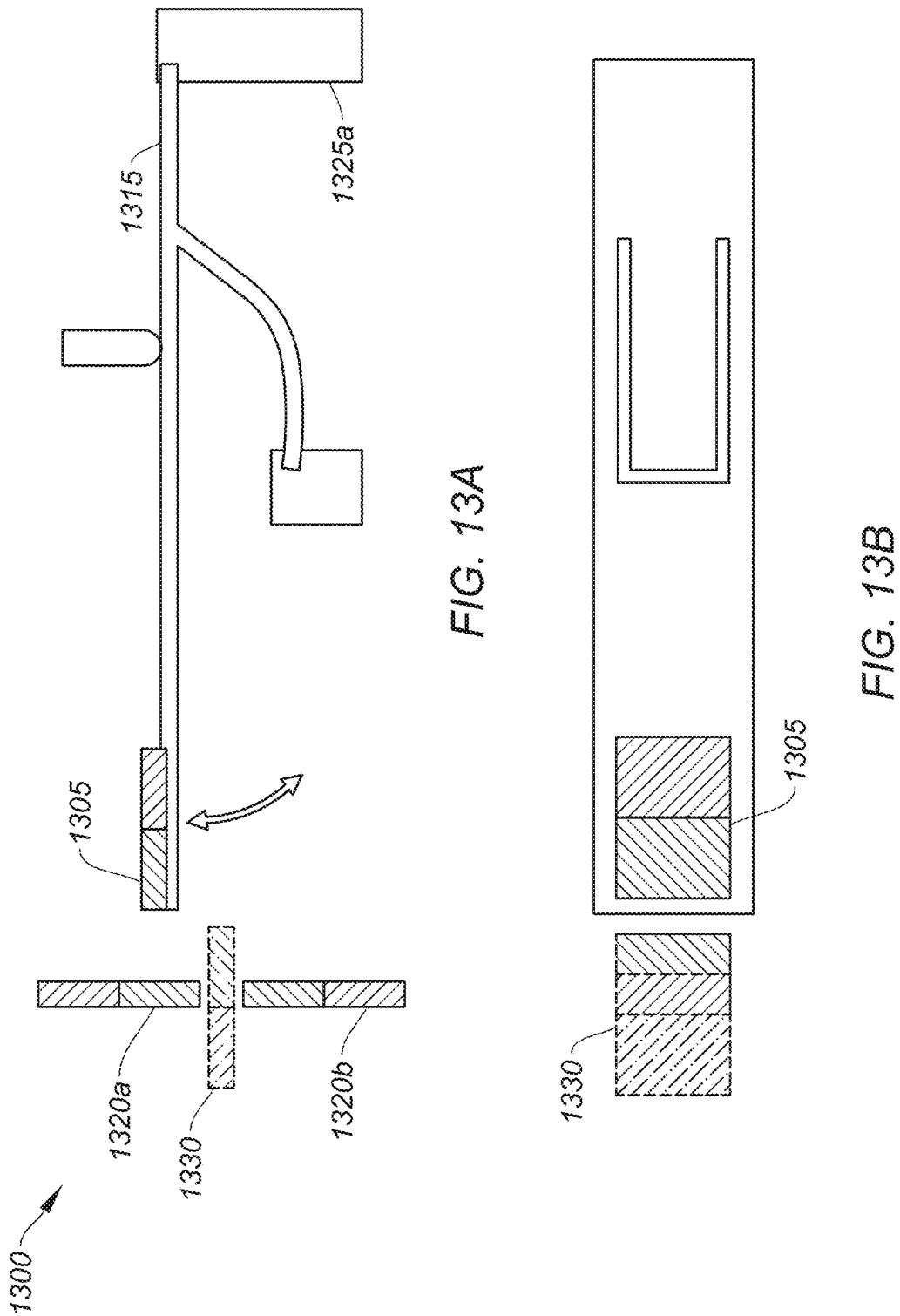
FIG. 13A shows a cross-sectional view of a non-contact magnet-based switch according to certain embodiments.
FIG. 13B shows a plan view of the non-contact magnet-based switch of FIG. 13A.

FIGS. 13A-13B show a non-contact magnet-based switch 1300 according to certain embodiments. The non-contact magnet-based switch 1300 is similar to the switch 500 of FIGS. 5A-5B except that the horizontal stationary magnet has been replaced by two vertical magnets. This can enable area savings such that the non-contact magnet-based switch can fit into a computer mouse. The two vertical magnets behave similar to a relatively thin horizontal magnet. FIG 13A shows a cross-sectional view of a non-contact magnet-based switch 1300, while FIG. 13B shows a plan view of the non-contact magnet-based switch 1300. The non-contact magnet-based switch 1300 can include a spring blade 1315 having a first end and a second end opposite the first end. The spring blade 1315 can be coupled to a first support structure 1325a at the first end of the spring blade 1315. The non-contact magnet-based switch 1300 can include a first magnet 1305. The first magnet 1305 can be disposed in a horizontal position at a second end of the spring blade 1315. The non-contact magnet-based switch 1300 can also include a second magnet 1320a and a third magnet 1320b, both of which being disposed in a vertical position. The second magnet 1320a and the third magnet 1320b can generate a magnetic field that is similar to a magnetic field generated by horizontal magnet 1330. In the illustrated embodiment, the first magnet 1305 can move while the second and third magnets 1320a and 1320b, respectively, are stationary.

Figures 14A, 14B:
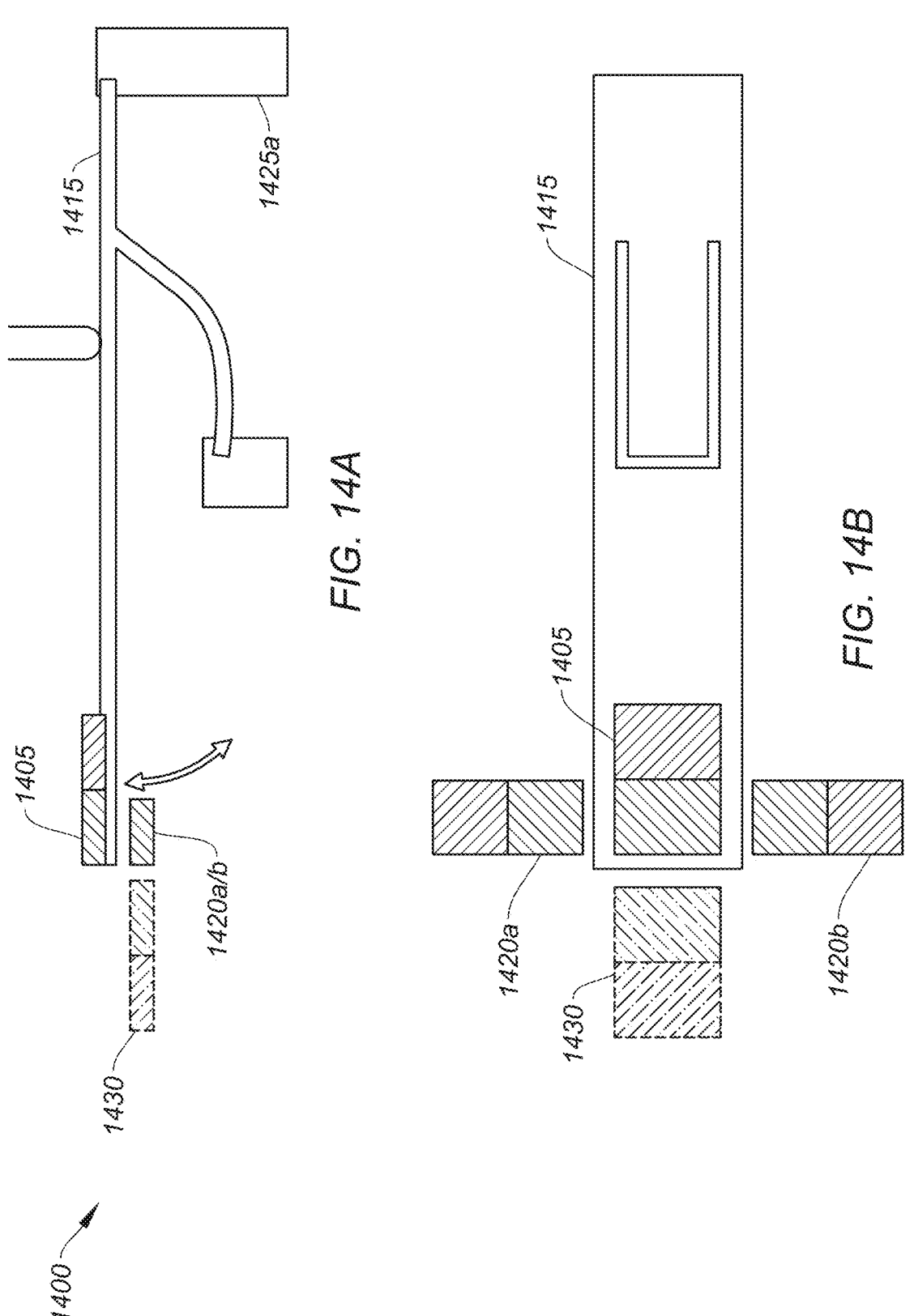
FIG. 14A shows a cross-sectional view of a non-contact magnet-based switch according to certain embodiments.
FIG. 14B shows a plan view of the non-contact magnet-based switch of FIG. 14A.

FIGS. 14A-14B show a non-contact magnet-based switch 1400 according to certain embodiments. The non-contact magnet-based switch 1400 is similar to the switch 1300 of FIGS.

13A-13B except that the two vertical magnets have been replaced by two horizontal magnets that are positioned on sides of the spring blade. The two horizontal magnets positioned on the sides of the spring blade behave similar to a horizontal magnet. FIG. 14A shows a cross-sectional view of a non-contact magnet-based switch 1400, while FIG. 14B shows a plan view of the non-contact magnet-based switch 1400. The non-contact magnet-based switch 1400 can include a spring blade 1415 having a first end and a second end opposite the first end. The spring blade 1415 can be coupled to a first support structure 1425a at the first end of the spring blade 1415. The non-contact magnet-based switch 1400 can include a first magnet 1405. The first magnet 1405 can be disposed in a horizontal position at a second end of the spring blade 1415. The non-contact magnet-based switch 1400 can also include a second magnet 1420a and a third magnet 1420b, both of which being disposed in a horizontal position on the sides on the spring blade 1415. The second magnet 1420a and the third magnet 1420b can generate a magnetic field that is similar to a magnetic field generated by horizontal magnet 1430. In the illustrated embodiment, the first magnet 1405 can move while the second and third magnets 1420a and 1420b, respectively, are stationary.

Figure 15:
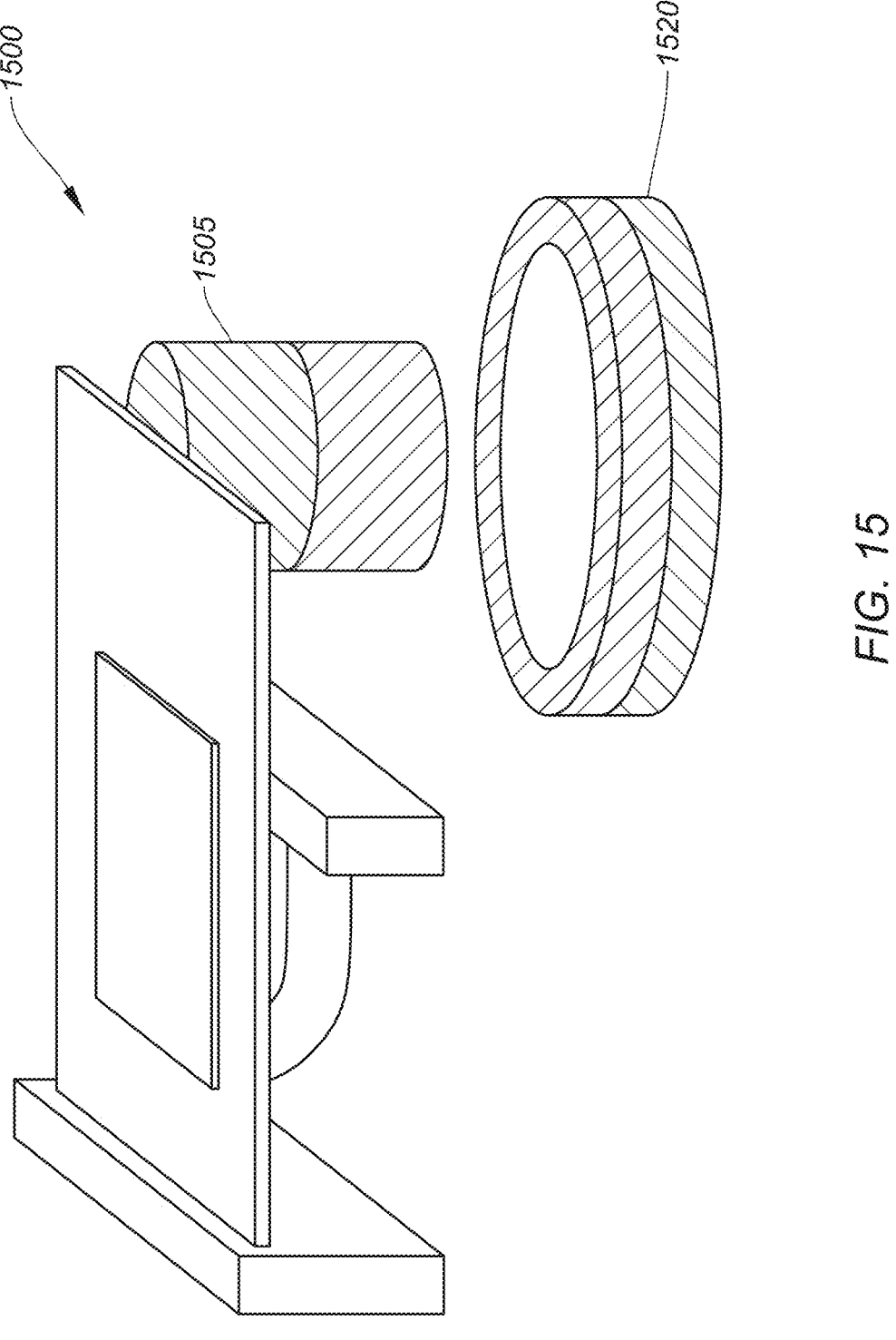
FIG. 15 shows a non-contact magnet-based switch according to certain embodiments.

FIG. 15 shows a non-contact magnet-based switch 1500 according to certain embodiments. The non-contact magnet-based switch 1500 is similar to the switch 500 of FIGS. 5A-5B, except that the first magnet has a circular shape, while the second magnets may have a ring, toroidal, hollow, and/or cylindrical shape. As shown in FIG. 15, the first magnet 1505 may have a circular shape and the second magnet 1520 can have a ring, toroidal, hollow, and/or cylindrical shape enabling the first magnet 1505 to move through the second magnet 1520 without making contact with the second magnet 1520. The first magnet 1505 can move while the second magnet 1520 is stationary. In some embodiments, the second magnet 1520 can also move. In some other embodiments, the first moving magnet can be a ring magnet and the second static magnet can be a circular shape, in that case the first magnet goes around the second magnet when moving.

Figure 16:
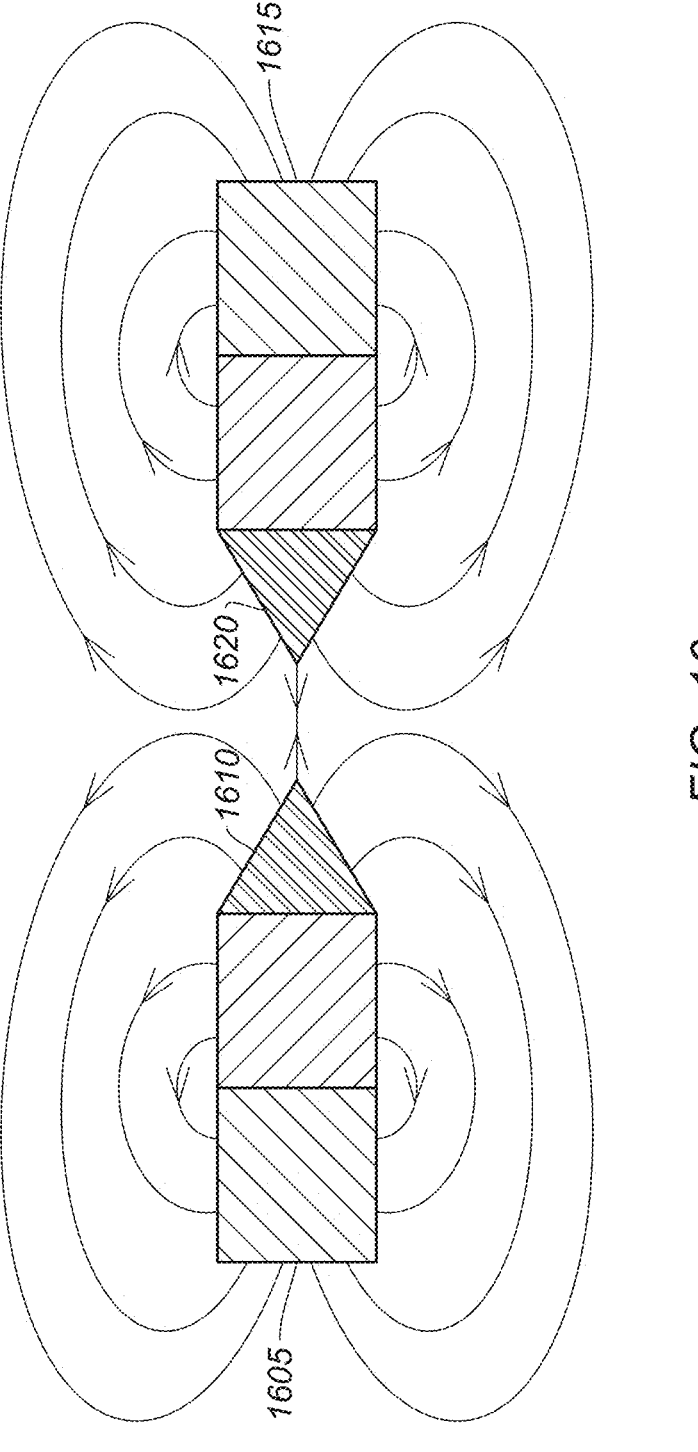
FIG. 16 shows a pair of magnets with soft iron structures attached to them to focus their magnetic fields, according to certain embodiments.

FIG. 16 shows a pair of magnets with soft iron structures attached to them to focus their magnetic fields, according to certain embodiments. As shown in FIG. 16, a first magnet 1605 can have a first soft iron structure 1610 attached to it at one end. In some embodiments, a first soft iron structure 1610 can have a triangular shape, while in other embodiments it can have a rectangular or circular shape. The shape of the soft iron structures 1610 can be customized for a specific application. A second magnet 1615 can have a second soft iron structure 1620 attached to it at one end. In some embodiments, the second soft iron structure 1620 can have a triangular shape, while in other embodiments it can have a rectangular or circular shape. The soft iron structures can manipulate the shape of the magnetic fields, for example, by concentrating the magnetic fields between the first and second magnets, thereby enabling the use of the first and second magnets in relatively small non-contact magnet-based switches. The soft iron material can have a different permittivity than the permittivity of the first or second magnets. In various embodiments, the soft iron structure of the first magnet 1610 and of the second magnet 1620 can have a different shape.

Figure 17:
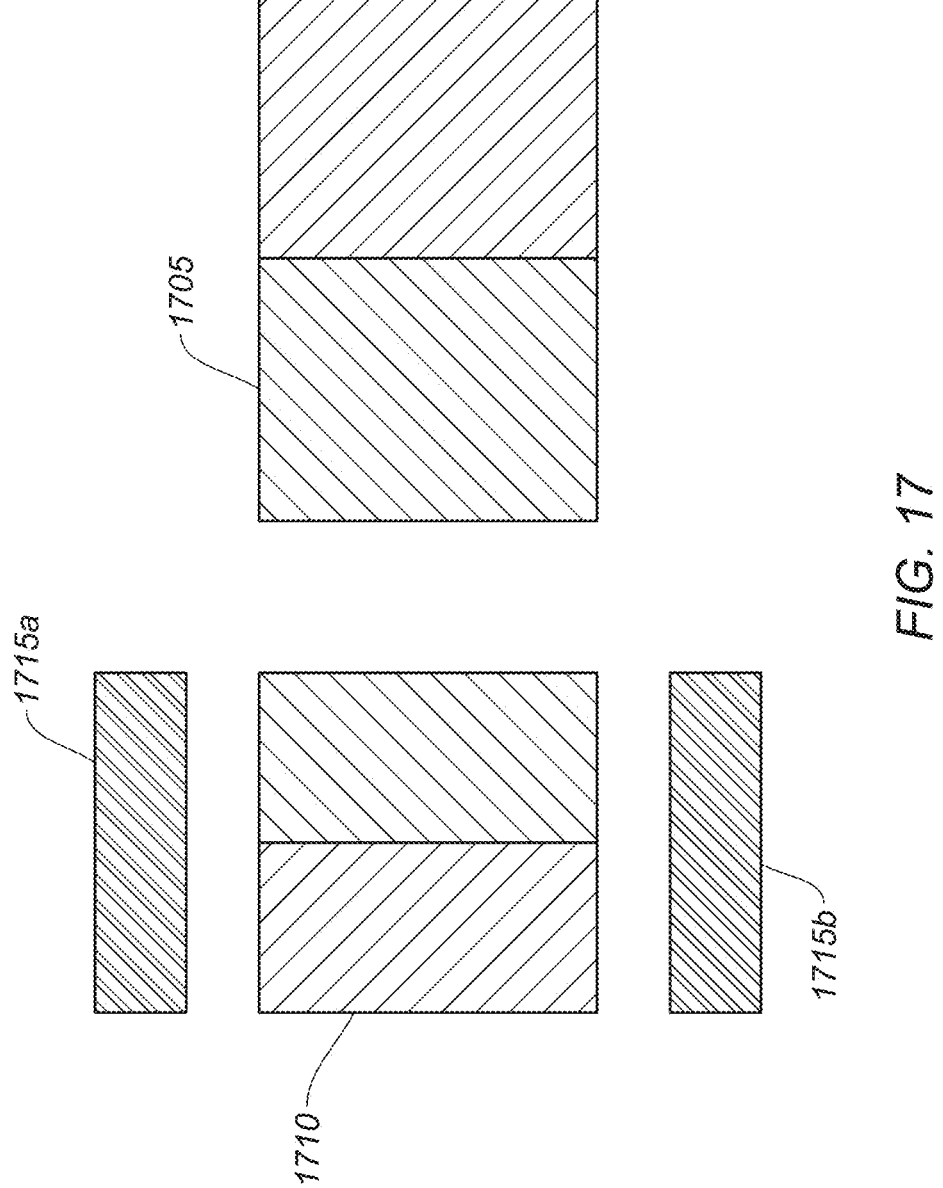
FIG. 17 shows a pair of magnets with ferromagnetic structures around the magnets to strengthen their magnetic fields by concentration, and to narrow a space of interaction between the magnets, according to certain embodiments.

FIG. 17 shows a pair of magnets with ferromagnetic structures around the magnets to strengthen their magnetic fields by concentration, and to narrow a space of interaction between the magnets, according to certain embodiments. FIG. 17 shows a first magnet 1705 and a second magnet 1710 positioned apart from the to the first magnet 1705. A first ferromagnetic structure 1715a and a second ferromagnetic structure 1715b can be disposed on the sides of the second magnet 1710. In some embodiments, the ferromagnetic structures can have rectangular shapes while in other embodiments they may have triangular shapes. The ferromagnetic structures can enable strengthening of the magnetic field formed by the first and second magnets and to narrow a space of interaction between the first and second magnets. In this way, the first and second magnets can be used in relatively small non-contact magnet-based switches. Further, the ferromagnetic structures can act as a local densifier of the magnetic field, such that a smaller magnet can generate a similar force/travel than its larger counterpart, while also achieving a relatively intense click feedback by increasing the sharpness/ratio and amplitude of the force drop 725.

Figure 18:
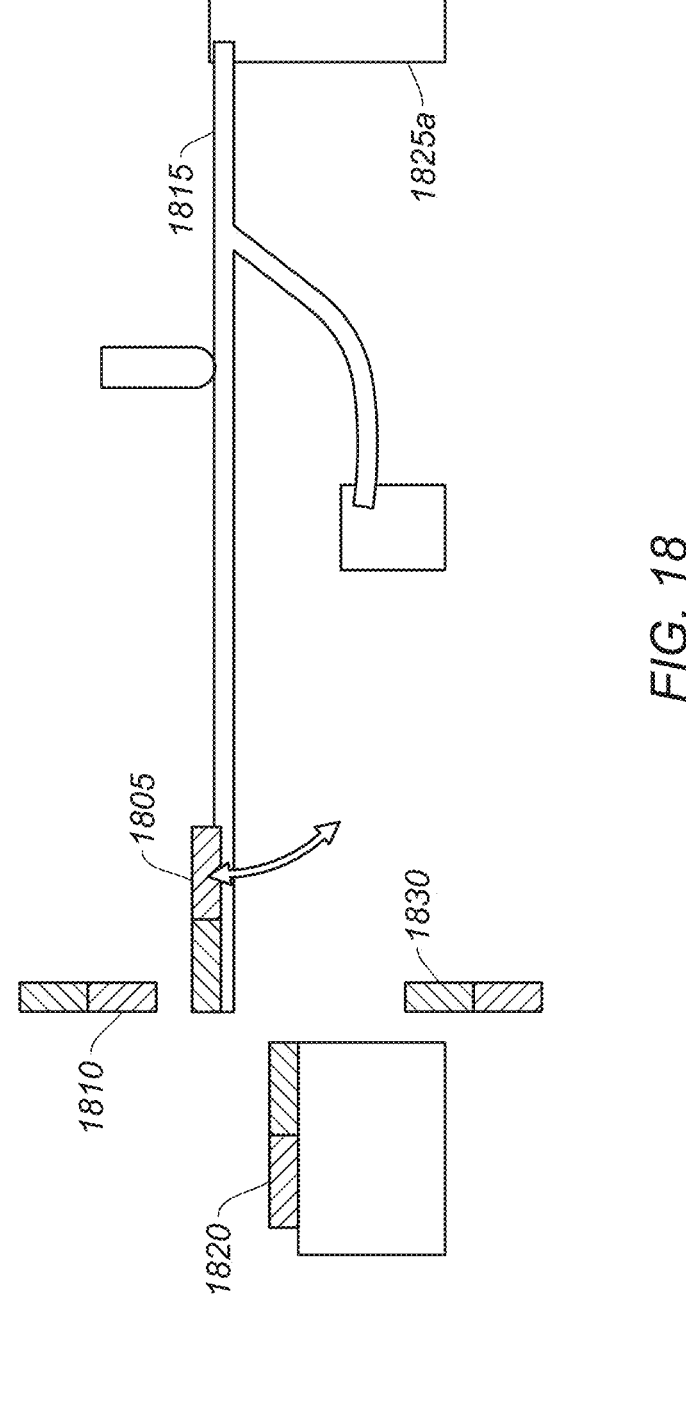
FIG. 18 shows a non-contact magnet-based switch with vibration damping according to certain embodiments.

FIG. 18 shows a non-contact magnet-based switch with vibration damping according to certain embodiments. FIG. 18 shows a cross-sectional view of a non-contact magnet-based switch 1800. The non-contact magnet-based switch 1800 is similar to the non-contact magnet-based switch 500 with the additional magnets for vibration damping. The non-contact magnet-based switch 1800 can include a spring blade 1815 having a first end and a second end opposite the first end. The spring blade 1815 can be coupled to a first support structure 1825a at the first end of the spring blade 1815. The non-contact magnet-based switch 1800 can include a first magnet 1805. The first magnet 505 can be disposed in a horizontal position at a second end of the spring blade 1815. The non-contact magnet-based switch 1800 can also include a second magnet 1820 disposed in a horizontal position. In the illustrated embodiment, the first magnet 1805 can move while the second magnet 1820 is stationary. In various embodiments, vibration damping can be achieved by any type of mechanical dampers such as, but not limited to, viscoelastic materials, grease, fluid, etc.

The non-contact magnet-based switch 1800 can further include a third magnet 1810 that is positioned above the first magnet 1805, and a fourth magnet 1830 that is positioned below the first magnet 1805. The third magnet 1810 and the fourth magnet 1830 are arranged to dampen a vibration that may exist at the end of the click and de-click. In some embodiments, the third magnet 1810 and the fourth magnet 1830 are arranged for latching the up and down positions. While the third and fourth magnets are not included for haptic reasons, they may have some effects particularly the third magnet may have some attraction effect. The third and fourth magnets may add a force threshold before the spring blade 1815 can start to move (also referred to as preload). This can be a benefit for the user experience because it may prevent motion of the mouse keyplate when a user is resting a finger on the keyplate.

Figure 19:
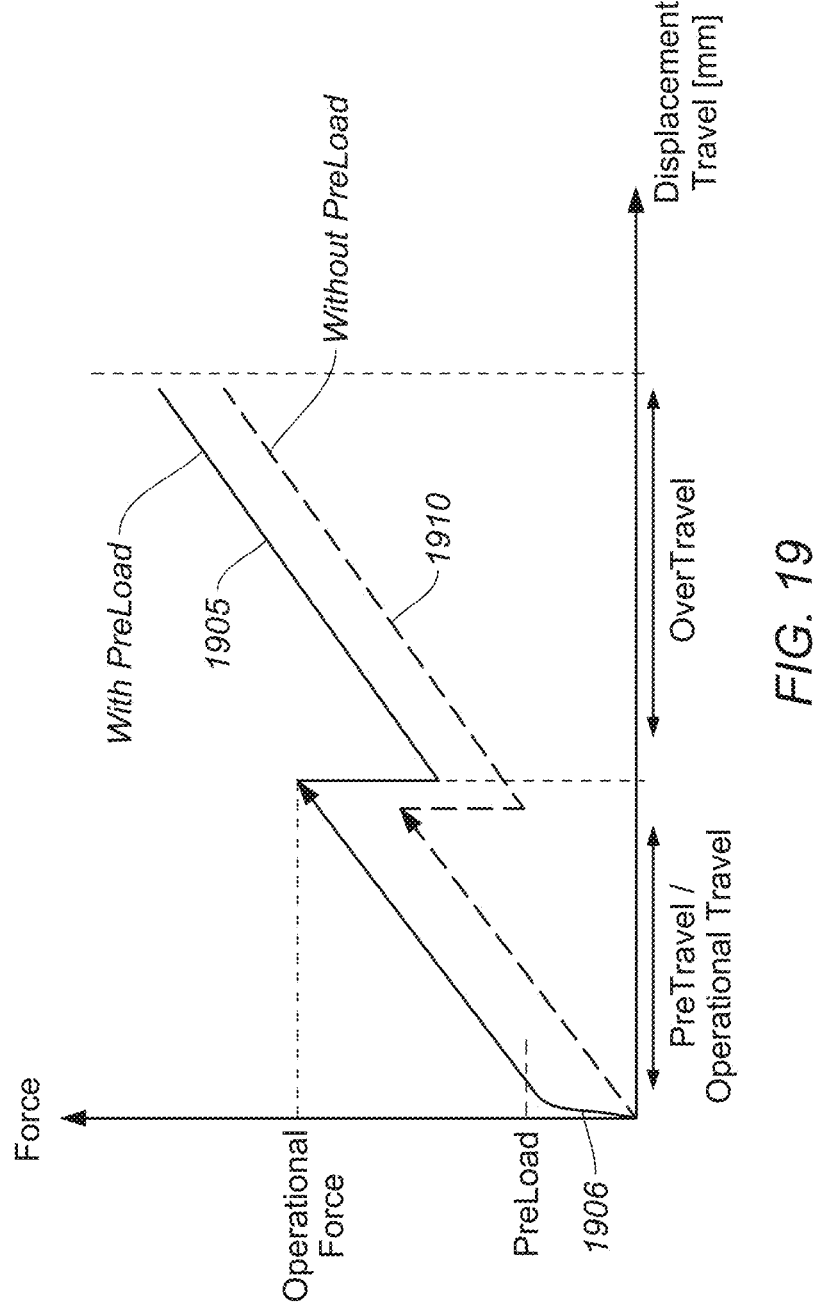
FIG. 19 shows the effect of addition of the vibration damping magnets, adding preload to the non-contact magnet-based switch of FIG. 18.

FIG. 19 shows the effect of addition of the vibration damping magnets, adding preload to the non-contact magnet-based switch of FIG. 18. In FIG. 19, graph 1905 shows force-travel with preload, as compared to graph 1910 without preload. As can be seen, the force-travel graph 1905 has an initial portion that rises rapidly 1906 and then becomes linear similar to force-travel graph 1910.

Figure 20A:
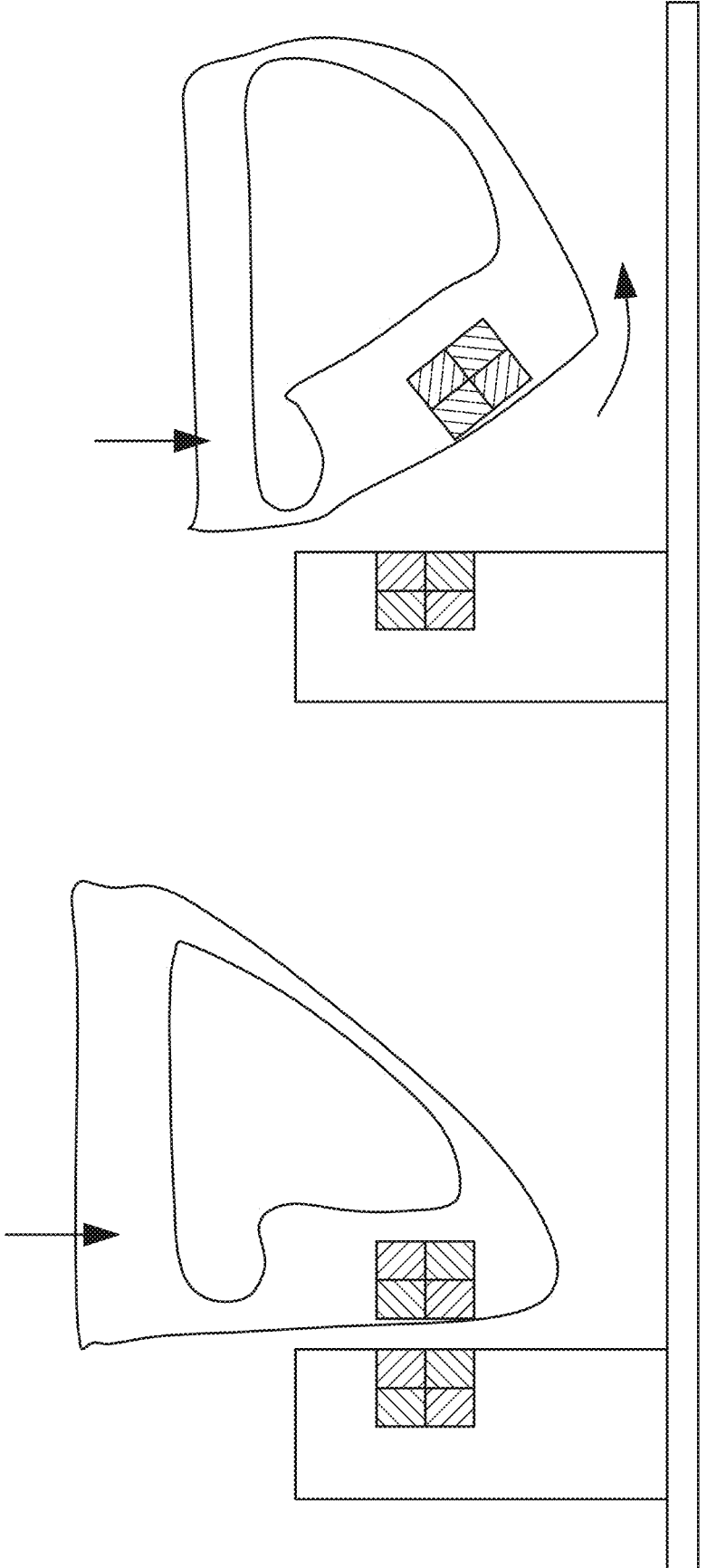
FIGS. 20A shows a non-contact magnet-based mechanism based on a compliant structure and its behavior while pressed, according to certain embodiments.
Figure 20B:
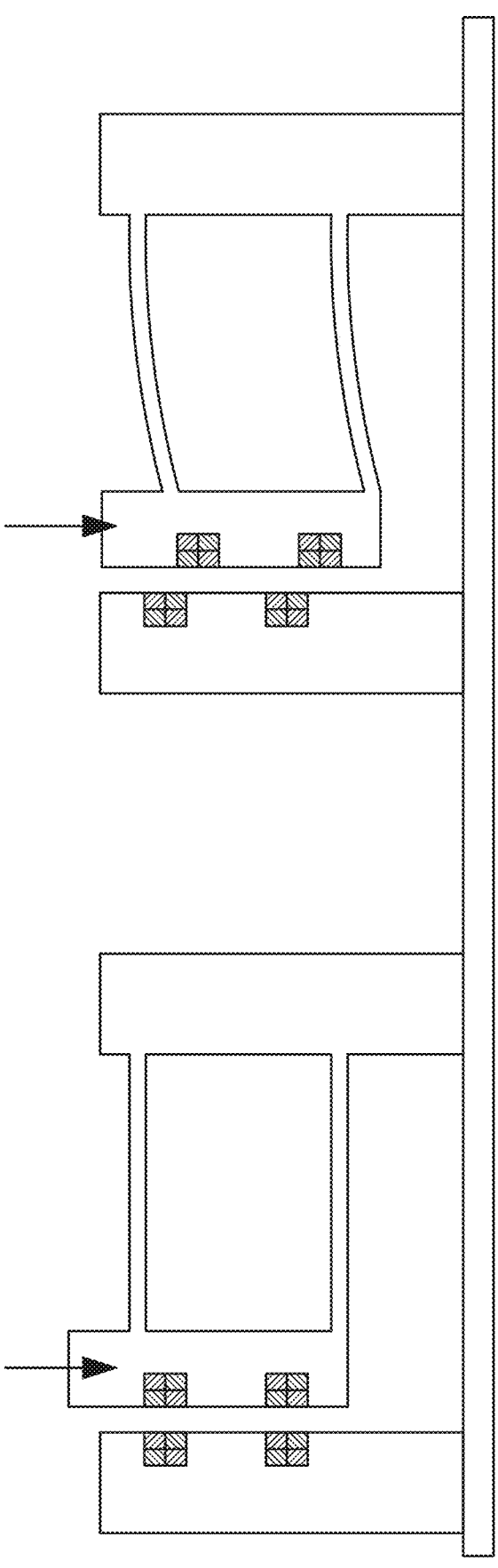
FIG. 20B shows another compliant structure of the non-contact magnet-based mechanism and its behavior while pressed, according to certain embodiments.

FIGS. 20A shows a non-contact magnet-based mechanism based on a compliant structure and its behavior while pressed, according to certain embodiments. FIG. 20B shows another compliant structure of the non-contact magnet-based mechanism and its behavior while pressed, according to certain embodiments. In the illustrated embodiment, use of compliant material can enable adjustment of the force profile and the stopper. FIG. 20A shows an embodiment that is linear initially, but is then followed by a second angular motion while FIG. 20B shows an embodiment that remains linear during most of the motion. The compliant structure can be customized for an applicable user experience through the addition of more rigid or more soft structures.

Figure 21:
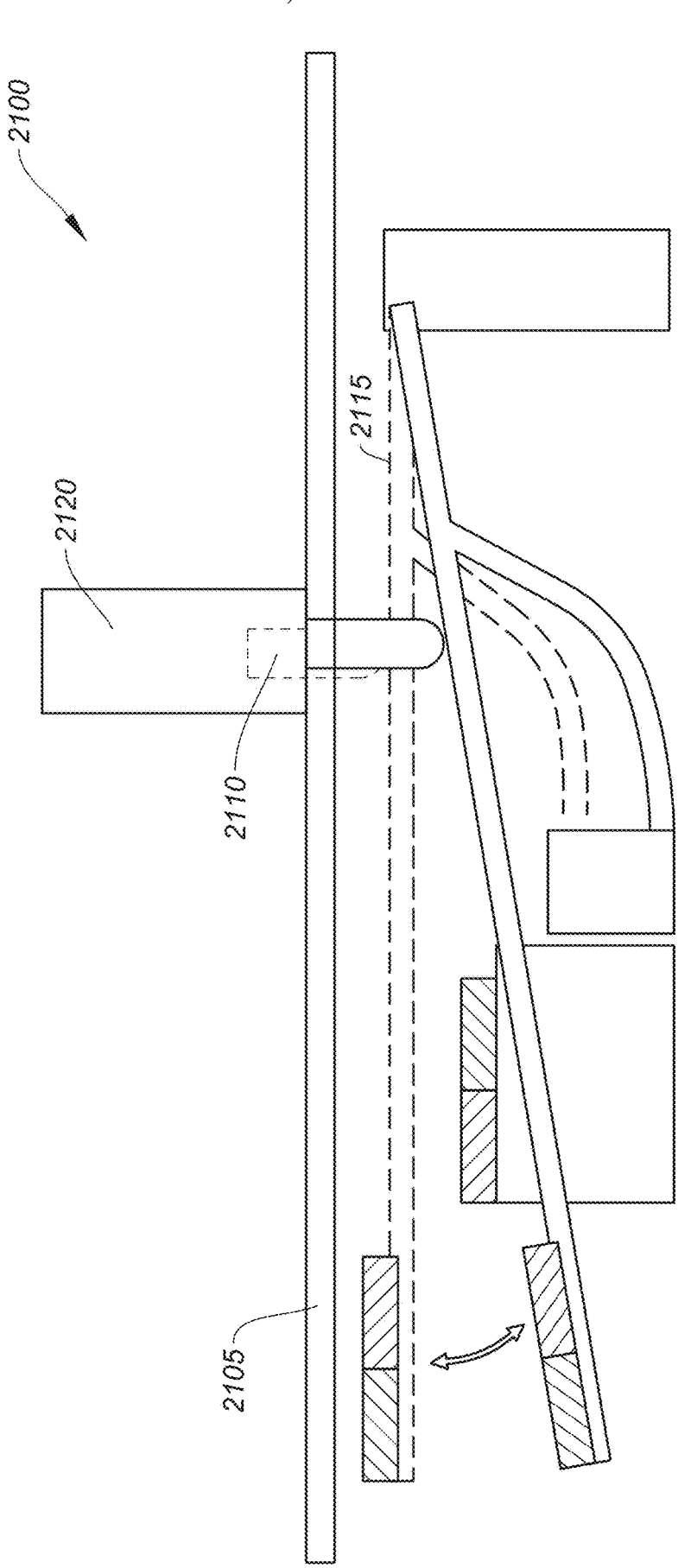
FIG. 21 shows non-contact magnet-based switch that can limit the travel of the actuator to prevent damage to the spring blade, according to certain embodiments.
Figure 22:
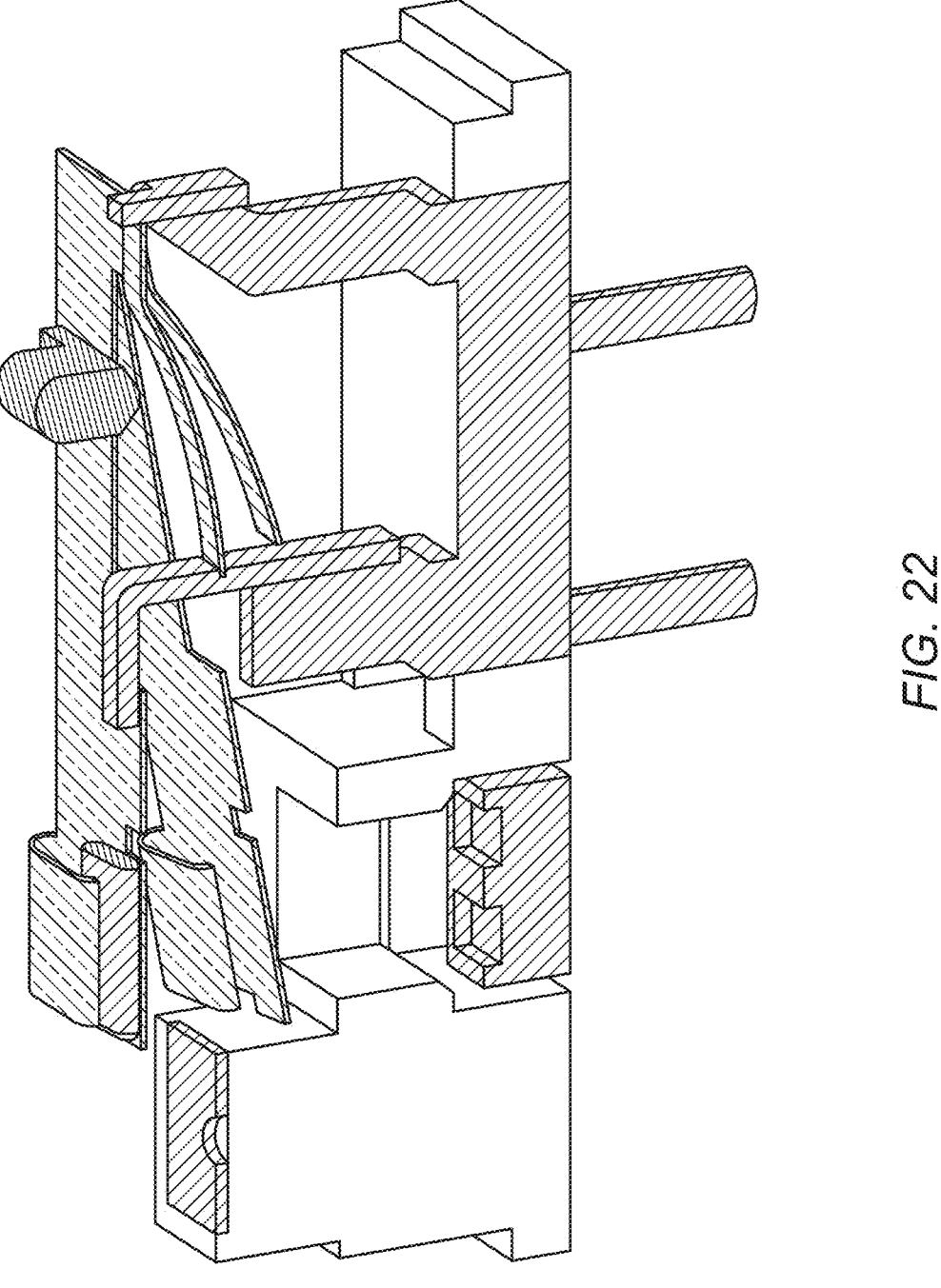
FIG. 22 shows a three-dimensional view of the non-contact magnet-based switch of FIG. 21.

FIG. 21 shows non-contact magnet-based switch that can limit the travel of the actuator to prevent damage to the spring blade, according to certain embodiments. In order to prevent structural damage to the spring blade, the spring blade can be dimensioned such that it may not reach its plastic deformation limit, thereby preventing the spring blade from working close to its wear limit. The non-contact magnet-based switch 2100 can include a spring blade 2115. The non-contact magnet-based switch 2100 can include an actuator 2110. A keyplate 2120 can be coupled to the actuator 2110. A top-case 2105 can be added to limit the travel of the actuator 2110. When the actuator 2110 reaches the bottom of the intended travel, the actuator 2110 is flush with the top-case 2105 and may not be pressed further by the keyplate 2120. In this way, the travel of the spring blade 2115 can be limited to prevent damage to the spring blade. FIG. 22 shows a three-dimensional view of the non-contact magnet-based switch of FIG. 21.

Figure 23:
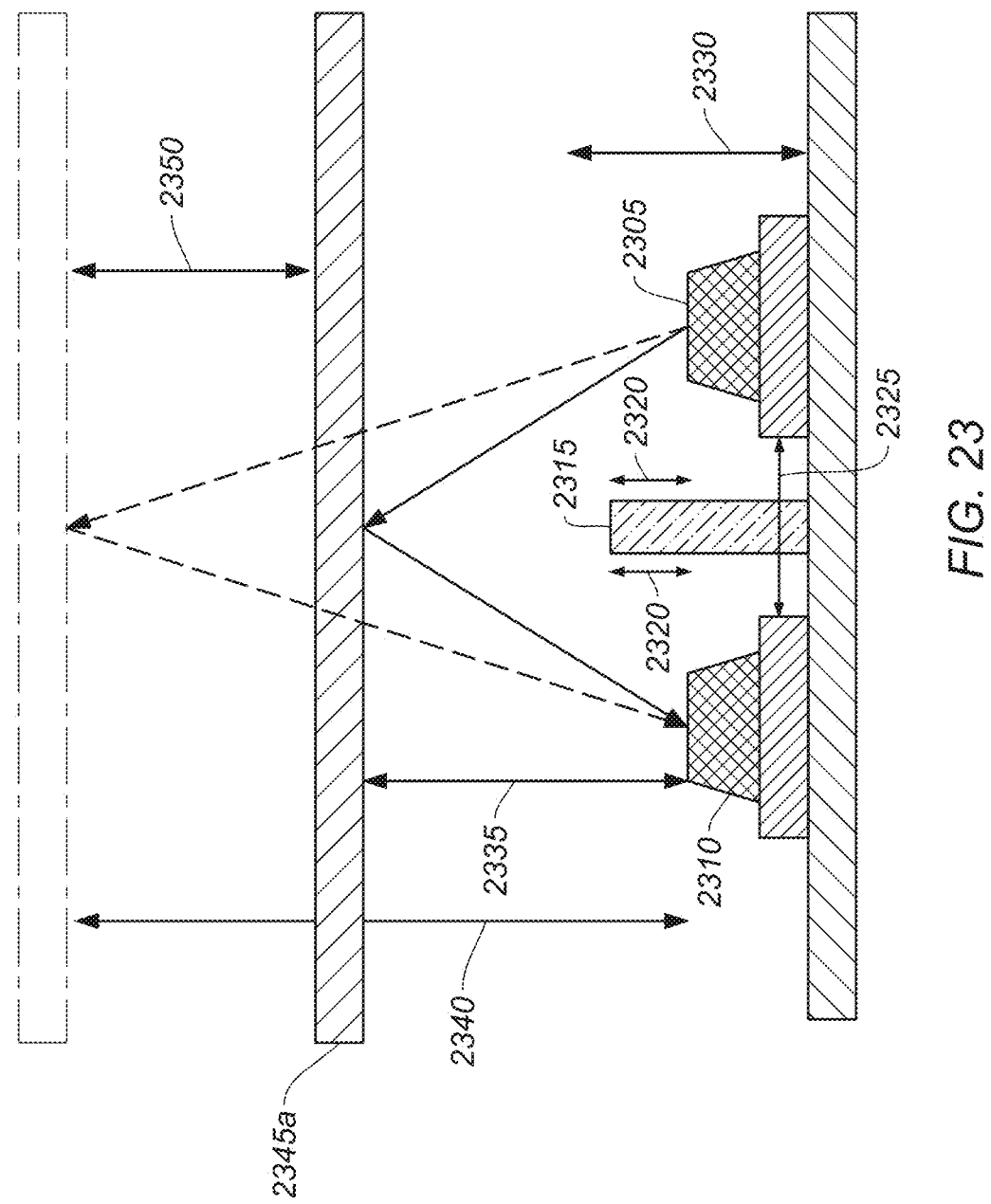
FIG. 23 shows an optical sensing system arranged to sense position of a spring blade according to certain embodiments.

In some embodiments, position of the spring blade of a non-contact magnet-based switch can be sensed and fed back to a computer by including a position sensor in the computer mouse to sense the position of the switch. FIG. 23 shows an optical sensing system 2300 arranged to sense position of a spring blade according to certain embodiments. The optical sensing system 2300 can include a light emitting diode (LED) 2305, a phototransistor 2310 and an opaque optical barrier 2315 positioned between the LED 2305 and the phototransistor 2310. In some embodiments, the LED can be an IR LED, while the opaque optical barrier 2315 may be opaque to IR. The LED 2305 can emit a light that travels to a spring blade 2345a, bounces off the spring blade 2345a and is detected by the phototransistor 2310.

The LED 2305 is positioned a distance 2325 from the apart from the phototransistor 2310. In some embodiments, the distance 2325 can be 0.5 mm to 2 mm, while in other embodiments the distance 2325 can be 0.7 mm to 1.5 mm, and in yet other embodiments the distance 2325 can be 0.9 mm to 1.1 mm. As appreciated by one of ordinary skill in the art having the benefit of this disclosure, the distance 2325 can be set to any suitable value. The opaque optical barrier 2315 may be higher than a top of the LED 2305 package and a top of the phototransistor 2310 package by a height 2320. In some embodiments, the height 2320 can be 0.1 mm to 0.35 mm, while in other embodiments the height 2320 can be 0.15 mm to 0.3 mm, and in yet other embodiments the height 2320 can be 0.19 mm to 0.21 mm. As appreciated by one of ordinary skill in the art having the benefit of this disclosure, the height 2320 can be set to any suitable value.

The LED 2305 package can have a height 2330. In some embodiments, the height 2330 can be 0.5 mm to 0.95 mm, while in other embodiments the height 2330 can be 0.6 mm to 0.9 mm, and in yet other embodiments the height 2330 can be 0.7 mm to 0.85 mm. As appreciated by one of ordinary skill in the art having the benefit of this disclosure, the height 2330 can be set to any suitable value. For proper operation of the optical sensing system, there can be a minimum reflective distance 2335 between the spring blade 2345a and the phototransistor 2310, and a maximum reflective distance 2340. In some embodiments, a range for the minimum reflective distance 2335 and for the maximum reflective distance 2340 can be 0.5 mm to 7 mm, while in other embodiments the range can be 0.7 to 6 mm, and in yet other embodiments the range can be 1 mm to 5 mm. As appreciated by one of ordinary skill in the art having the benefit of this disclosure, the range for the minimum reflective distance 2335 and for the maximum reflective distance 2340 can be set to any suitable value for a specific application.

The spring blade 2345a may travel by a distance 2350. In some embodiments, the distance 2350 can be 1 mm to 2 mm, while in other embodiments the distance 2350 can be 1.2mm to 1.8 mm, and in yet other embodiments the distance 2350 can be 1.5 mm. As appreciated by one of ordinary skill in the art having the benefit of this disclosure, the distance 2350 can be set to any suitable value.

In various embodiments, the non-contact magnet-based switch sensing can be achieved use of optical reflective sensing to minimize the impact of mechanical tolerances, but an optical barrier solution can also be used. A structure can be added on the moving blade that crosses the optical path between the LED and phototransistor. The position of the blade can also be detected by the position of the moving magnets by using any magnetic sensing solutions such as, but not limited to, Hall effect sensor, AMR, TMR, etc. In some embodiments, sensing can be achieved by detecting a position of the blade by use of magnetic coupling such as, but not limited to, Eddy current sensing or other inductive sensing approaches. All those solutions have the advantage of being contactless, preventing the generation of acoustic noise and are within the scope of the present disclosure.

Figure 24:
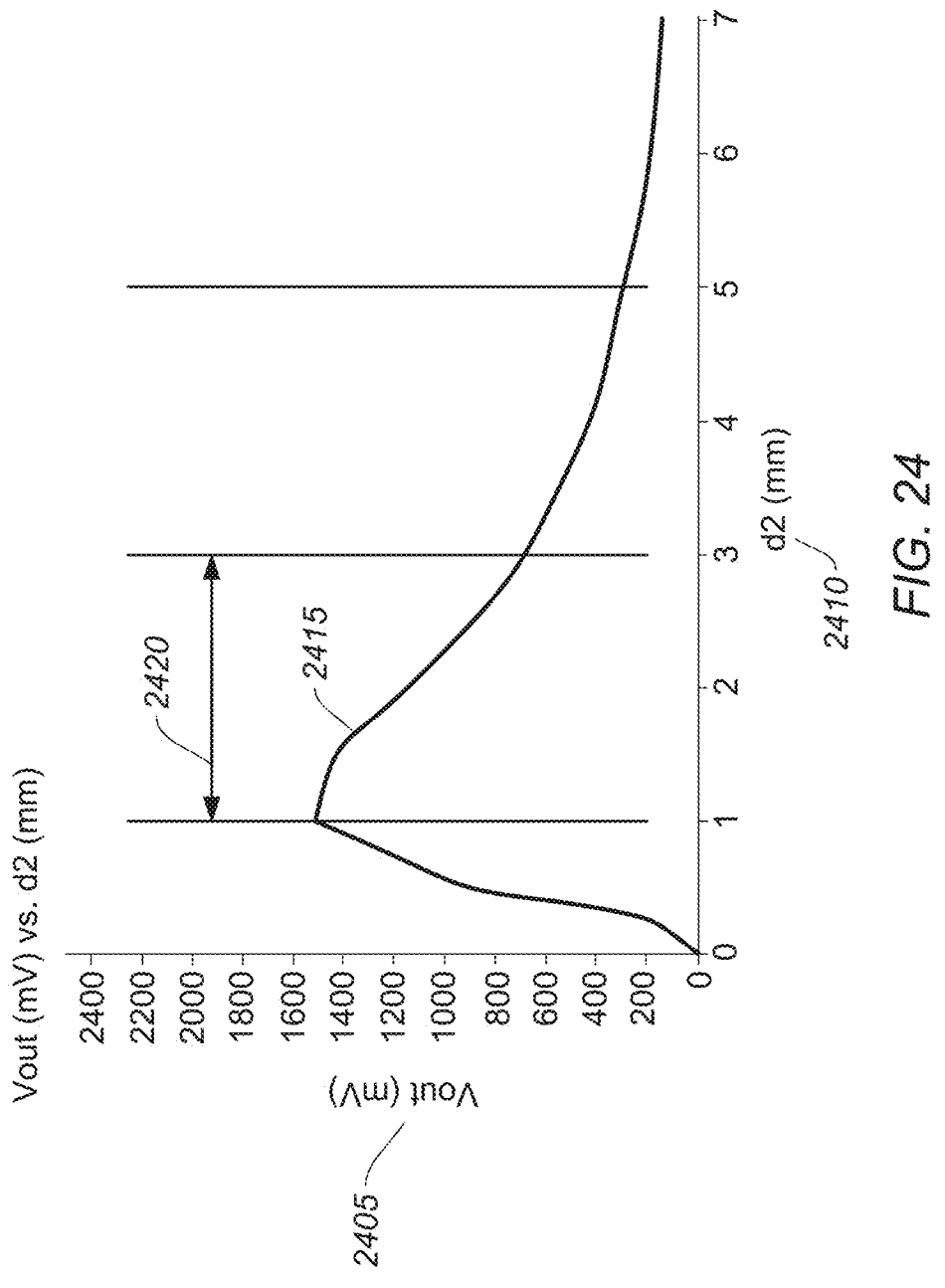
FIG. 24 shows an output voltage of a phototransistor as a function of distance used in the optical sensing system of FIG. 23.

As shown in FIG. 24, the phototransistor 2310 can generate an output voltage 2405 that is a function of the distance 2410 between the spring blade and the phototransistor 2310. Graph 2415 shows the output voltage 2405 rising with increasing distance 2410 to a peak value and then decreasing as the distance 2410 is increased further. When the spring blade is relatively close to the phototransistor 2310, no light goes through the optical barrier therefore no signal is generated. In some embodiments, a portion of the curve 2420 after a peak of the output voltage can be utilized to sense the position of the spring blade. In some embodiments, a portion of the curve 2420 before a peak of the output voltage can be utilized to sense the position of the spring blade. In some embodiments, a firmware can follow and keeping history, and the full length of the curve can be used.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied-for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer mouse comprising:

a housing;

a button that is translatable relative to at least a portion of the housing, the button coupled to a deflection plate, the deflection plate comprising a movable portion;

a first magnet coupled on the movable portion of the deflection plate, the first magnet being translatable along a predefined path, a surface of the first magnet defining a first plane; and a second magnet disposed proximate the predefined path such that at least a portion of a magnetic field of the second magnet extends into a medial portion of the predefined path, a surface of the second magnet defining a second plane;

wherein the first magnet has a first pole and a second pole, and the second magnet has a third pole and a fourth pole;

wherein the third pole faces the first pole and the fourth pole faces away from the first pole;

wherein a distance from the first pole to the third pole is less than a distance from the first pole to the fourth pole;

wherein a polarity of the first pole is the same as the polarity of the third pole;

wherein when an actuation force is applied on the button, the first magnet moves in a direction along the predefined path; and wherein when moving in the direction along the predefined path, repulsive forces between the first and second magnets cause the deflection plate to produce haptic feedback when the first magnet crosses a cross-over point that is located where the first plane of the first magnet is co-planar with the second plane of the second magnet.

2. The computer mouse of claim 1, wherein the deflection plate is arranged to snap back when the actuation force is removed.

3. The computer mouse of claim 1, wherein the repulsive forces between the first and second magnets reduce an amount of the actuation force applied on the button after the first magnet crosses the cross-over point in the direction along the predefined path.

4. The computer mouse of claim 1, wherein the deflection plate is arranged to generate a noise level of 30 dBA or less when producing the haptic feedback.

5. The computer mouse of claim 1, wherein the deflection plate comprises a first end and a second end opposite the first end, and wherein the first magnet is disposed on the first end of the deflection plate.

6. The computer mouse of claim 5, wherein the housing comprises a support structure and wherein the second end of the deflection plate is coupled to the support structure.

7. The computer mouse of claim 1, wherein the second magnet is disposed laterally offset from the predefined path and is within 0.5 mm of the predefined path.

8. The computer mouse of claim 1, wherein the housing comprises a sensor arranged to sense changes in a position of the deflection plate, wherein the sensor comprises a light emitting diode (LED) and a photo-transistor, wherein the LED and the photo-transistor are disposed in the housing under the deflection plate.

9. A switch comprising:

a deflection plate mounted on a support structure, the deflection plate comprising a movable portion;

a first magnet coupled on the movable portion of the deflection plate, the first magnet being translatable along a predefined path;

a second magnet disposed proximate the predefined path such that at least a portion of a magnetic field of the second magnet extends into a medial portion of the predefined path;

wherein the first magnet has a first pole and a second pole, and the second magnet has a third pole and a fourth pole;

wherein the third pole faces the first pole and the fourth pole faces away from the first pole;

wherein a distance from the first pole to the third pole is less than a distance from the first pole to the fourth pole; and wherein a polarity of the first pole is the same as the polarity of the third pole;

a third magnet disposed above the deflection plate; and a fourth magnet disposed under the deflection plate, wherein the third and fourth magnets are arranged to dampen vibrations of the deflection plate.

10. The switch of claim 9, wherein the second magnet is disposed laterally offset from the predefined path and is within 0.5 mm of the predefined path.

11. The switch of claim 9, wherein the deflection plate comprises a bent portion that extends downwards to a fixed location and secured to the fixed location.

12. The switch of claim 9, further comprising a ferromagnetic structure disposed alongside the second magnet, wherein the ferromagnetic structure is arranged to increase a concentration of the magnetic field of the second magnet.

13. A switch comprising:

a deflection plate mounted on a support structure, the deflection plate comprising a movable portion;

first and second magnets coupled on the movable portion of the deflection plate, the first and second magnets being translatable along a predefined path; and third and fourth magnets disposed proximate the predefined path such that at least a portion of a magnetic field of the third magnet and at least a portion of a magnetic field of the fourth magnet extends into a medial portion of the predefined path;

wherein the first magnet has a first pole and a second pole;

wherein the second magnet has a third pole and a fourth pole;

wherein the third magnet has a fifth pole and a sixth pole;

wherein the fourth magnet has a seventh pole and an eight pole;

wherein the first pole faces the fifth pole, and the third pole faces the seventh pole, and the second pole faces away from the sixth pole and the fourth pole faces away from the eight pole;

wherein a distance from the first pole to the fifth pole is less than a distance from the first pole to the sixth pole;

wherein a distance from the third pole to the seventh pole is less than a distance from the third pole to the eight pole; and wherein a polarity of the first pole is opposite the polarity of the fifth pole.

14. The switch of claim 13, wherein a polarity of the third pole is opposite the polarity of the seventh pole.

15. A switch comprising:

a compliant structure having a movable portion;

first and second magnets coupled on the movable portion of the compliant structure, the first and second magnets being translatable along a predefined path; and third and fourth magnets disposed proximate the predefined path such that at least a portion of a magnetic field of the third magnet and at least a portion of a magnetic field of the fourth magnet extends into a medial portion of the predefined path;

wherein the first magnet has a first pole and a second pole;

wherein the second magnet has a third pole and a fourth pole;

wherein the third magnet has a fifth pole and a sixth pole;

wherein the fourth magnet has a seventh pole and an eight pole;

wherein the first pole faces the fifth pole, and the third pole faces the seventh pole, and the second pole faces away from the sixth pole and the fourth pole faces away from the eight pole;

wherein a distance from the first pole to the fifth pole is less than a distance from the first pole to the sixth pole;

wherein a distance from the third pole to the seventh pole is less than a distance from the third pole to the eight pole; and wherein a polarity of the first pole is opposite the polarity of the fifth pole.

* * * * *